US012617066B2

(12) United States Patent
Sekido

(10) Patent No.: US 12,617,066 B2
(45) Date of Patent: May 5, 2026

(54) ELECTRIC WORK MACHINE AND DRIVER DRILL

(71) Applicant: MAKITA CORPORATION, Anjo (JP)

(72) Inventor: Kisho Sekido, Anjo (JP)

(73) Assignee: MAKITA CORPORATION, Anjo (JP)

( * ) Notice: Subject to any disclaimer, the term of this patent is extended or adjusted under 35 U.S.C. 154(b) by 176 days.

(21) Appl. No.: 18/151,926

(22) Filed: Jan. 9, 2023

(65) Prior Publication Data

US 2023/0271309 A1 Aug. 31, 2023

(30) Foreign Application Priority Data

Feb. 28, 2022 (JP) ................................ 2022-030116

(51) Int. Cl.
*B25F 5/00* (2006.01)
*B25B 23/147* (2006.01)

(52) U.S. Cl.
CPC ............ *B25F 5/001* (2013.01); *B25B 23/147* (2013.01)

(58) Field of Classification Search
CPC .................................................. B25B 23/1425
See application file for complete search history.

(56) References Cited

U.S. PATENT DOCUMENTS

| | | | | |
|---|---|---|---|---|
| 10,029,359 | B2 | 7/2018 | Papp | |
| 2012/0169256 | A1* | 7/2012 | Suda | B25B 21/00 318/17 |
| 2020/0223038 | A1* | 7/2020 | Araki | B25D 16/006 |
| 2020/0353610 | A1* | 11/2020 | Huggenberger | B23B 45/008 |

FOREIGN PATENT DOCUMENTS

| | | | | |
|---|---|---|---|---|
| JP | 2013-188822 | A | 9/2013 | |
| JP | 2013188822 | * | 9/2013 | B25F 5/00 |
| JP | 5376208 | B2 | 12/2013 | |
| JP | 5697457 | B2 | 4/2015 | |
| JP | 2015-091626 | A | 5/2015 | |
| JP | 5895158 | B2 | 3/2016 | |
| JP | 2021-024043 | A | 2/2021 | |

OTHER PUBLICATIONS

Jul. 1, 29, 2025 Office Action issued in Japanese Patent Application No. 2022-030116.

* cited by examiner

*Primary Examiner* — Daniel Jeremy Leeds

(74) *Attorney, Agent, or Firm* — OLIFF PLC

(57) ABSTRACT

An electric work machine avoids use of more lead wires. The electric work machine includes an operation unit operable in an operation mode of at least three operation modes, an operable member movable to switch the operation mode, a plurality of mode sensors located in a direction of movement of the operable member to detect the operable member and being equal in number to or fewer than the at least three operation modes, a mode sensor board on which the plurality of mode sensors are mounted and including an output terminal connected to the plurality of mode sensors, and a controller board connected to the output terminal with an output lead wire to determine the operation mode based on an output signal output from the output terminal.

18 Claims, 31 Drawing Sheets

FIG. 25

| | FIRST MODE SENSOR | SECOND MODE SENSOR | FIRST OUTPUT TERMINAL | SECOND OUTPUT TERMINAL |
|---|---|---|---|---|
| FIRST POSITION | ON | OFF | L | H |
| SECOND POSITION | OFF | OFF | H | H |
| THIRD POSITION | OFF | ON | H | L |

FIG. 27

| | FIRST MODE SENSOR | SECOND MODE SENSOR | OUTPUT TERMINAL |
|---|---|---|---|
| FIRST POSITION | ON | OFF | L |
| SECOND POSITION | OFF | OFF | H |
| THIRD POSITION | OFF | ON | R2/(R1+R2)×H |

FIG. 31

| | FIRST MODE SENSOR | SECOND MODE SENSOR | THIRD MODE SENSOR | OUTPUT TERMINAL |
|---|---|---|---|---|
| FIRST POSITION | ON | OFF | OFF | L |
| SECOND POSITION | OFF | OFF | OFF | H |
| THIRD POSITION | OFF | ON | OFF | $R2/(R1+R2) \times H$ |
| FOURTH POSITION | OFF | OFF | ON | $R3/(R1+R3) \times H$ |

ELECTRIC WORK MACHINE AND DRIVER DRILL

CROSS-REFERENCE TO RELATED APPLICATIONS

This application claims the benefit of priority to Japanese Patent Application No. 2022-030116, filed on Feb. 28, 2022, the entire contents of which are hereby incorporated by reference.

BACKGROUND

1. Technical Field

The present disclosure relates to an electric work machine and a driver drill.

2. Description of the Background

In the field of electric work machines, an electronic clutch driver drill is known as described in Japanese Unexamined Patent Application Publication No. 2021-024043 (hereafter, Patent Literature 1). The driver drill described in Patent Literature 1 includes a motor, an output shaft rotatable by the motor, and a transmission between the motor and the output shaft. A speed switch lever is operable to switch between a high-speed mode in which the transmission rotates the output shaft at a high speed and a low-speed mode in which the transmission rotates the output shaft at a low speed. The electronic clutch driver drill includes a controller that estimates the output torque of the output shaft. The controller stops rotating the motor in response to the estimated output torque being higher than or equal to preset clutch operation torque.

BRIEF SUMMARY

The driver drill in Patent Literature 1 includes a sensor that can detect the high-speed mode and the low-speed mode. The sensor transmits detection signals to the controller through lead wires. The use of more lead wires can reduce the internal space of a housing in the driver drill or cause difficulty in assembling the driver drill.

One or more aspects of the present disclosure are directed to a technique for avoiding use of more lead wires.

A first aspect of the present disclosure provides an electric work machine, including:

an operation unit operable in an operation mode of at least three operation modes;

an operable member movable to switch the operation mode;

a plurality of mode sensors located in a direction of movement of the operable member to detect the operable member, the plurality of mode sensors being equal in number to or fewer than the at least three operation modes;

a mode sensor board on which the plurality of mode sensors are mounted, the mode sensor board including an output terminal connected to the plurality of mode sensors; and a controller board connected to the output terminal with an output lead wire to determine the operation mode based on an output signal output from the output terminal.

A second aspect of the present disclosure provides an electric work machine, including:

an operation unit operable in an operation mode of a plurality of operation modes;

an operable member movable to switch the operation mode;

a plurality of mode sensors located in a direction of movement of the operable member to detect the operable member, the plurality of mode sensors being connected in parallel with one another;

a mode sensor board on which the plurality of mode sensors are mounted, the mode sensor board including an output terminal connected to the plurality of mode sensors; and a controller board connected to the output terminal with an output lead wire to determine the operation mode based on an output signal output from the output terminal, wherein each of the plurality of mode sensors is connected to the output terminal with a signal line.

A third aspect of the present disclosure provides a driver drill, including:

a motor;

a first planetary gear assembly including a first stage including a plurality of first planetary gears surrounding a sun gear rotatable by the motor and a first internal gear surrounding the plurality of first planetary gears, and a second stage having a reduction ratio different from a reduction ratio of the first stage and including a plurality of second planetary gears surrounding the sun gear and a second internal gear surrounding the plurality of second planetary gears;

a second planetary gear assembly located frontward from the first planetary gear assembly to be actuated by a rotational force from the first planetary gear assembly;

a spindle rotatable by a rotational force from the motor transmitted through the second planetary gear assembly;

a housing including a motor compartment accommodating the motor;

a first speed switch assembly switchable between a first reduction mode in which rotation of the second internal gear is prevented and rotation of the first internal gear is permitted, and a second reduction mode in which rotation of the first internal gear is prevented and rotation of the second internal gear is permitted;

a second speed switching assembly switchable between an enabled mode in which rotation of an internal gear in the second planetary gear assembly is prevented, and a disabled mode in which rotation of the internal gear is permitted;

an operable member movable to a first position, a second position, and a third position relative to the motor compartment; and two mode sensors configured to detect a position of the operable member, wherein with the operable member at the first position, the first planetary gear assembly is set to the second reduction mode, and the second planetary gear assembly is set to the disabled mode, with the operable member at the second position, the first planetary gear assembly is set to the first reduction mode, and the second planetary gear assembly is set to the disabled mode, and with the operable member at the third position, the first planetary gear assembly is set to the first reduction mode, and the second planetary gear assembly is set to the enabled mode.

The technique according to the above aspects of the present disclosure avoids use of more lead wires.

BRIEF DESCRIPTION OF DRAWINGS

FIG. 25 is a diagram describing the relationship between the position of the speed switch lever, the states of mode sensors, and output signals from output terminals in the first embodiment.

FIG. 27 is a diagram describing the relationship between the position of a speed switch lever, the states of mode sensors, and output signals from output terminals in the second embodiment.

FIG. 31 is a diagram of the relationship between the position of the speed switch lever, the states of mode sensors, and an output signal from an output terminal in the third embodiment.

DETAILED DESCRIPTION

In the above structure, the mode sensors are driven with a voltage applied through an input terminal and output signals.

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine.

The electric work machine includes a motor. In the embodiments, a direction parallel to a rotation axis AX of the motor is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX in the embodiments extends in the front-rear direction. The axial direction corresponds to the front-rear direction. The axial direction is from the rear to the front or from the front to the rear. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

First Embodiment

A first embodiment will now be described. The electric work machine according to the present embodiment is a driver drill, which is an example of a drilling work machine or a screwing work machine.

Overview of Driver Drill

Figure 1:
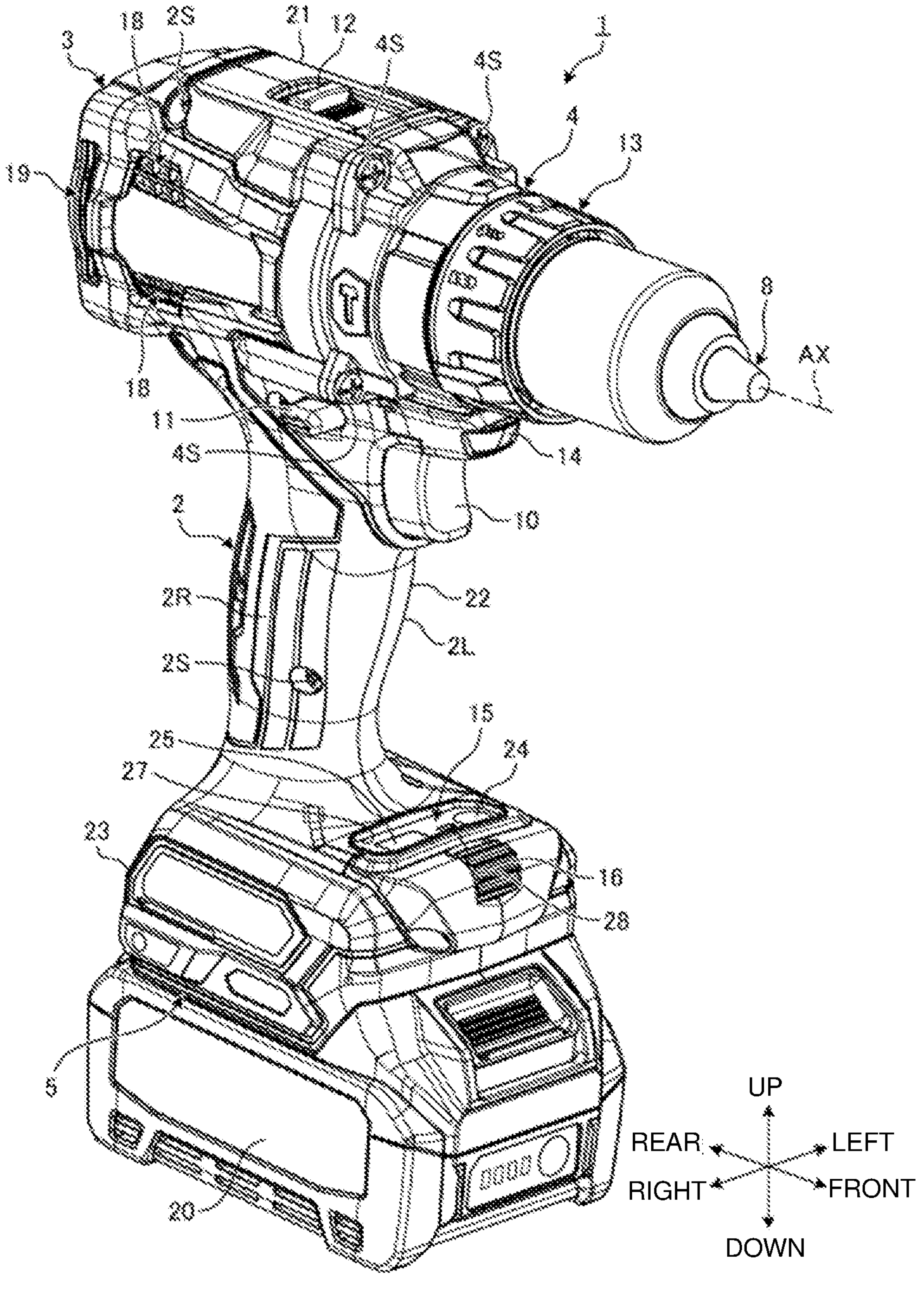
FIG. 1 is a perspective view of a driver drill according to a first embodiment as viewed from the front.
Figure 2:
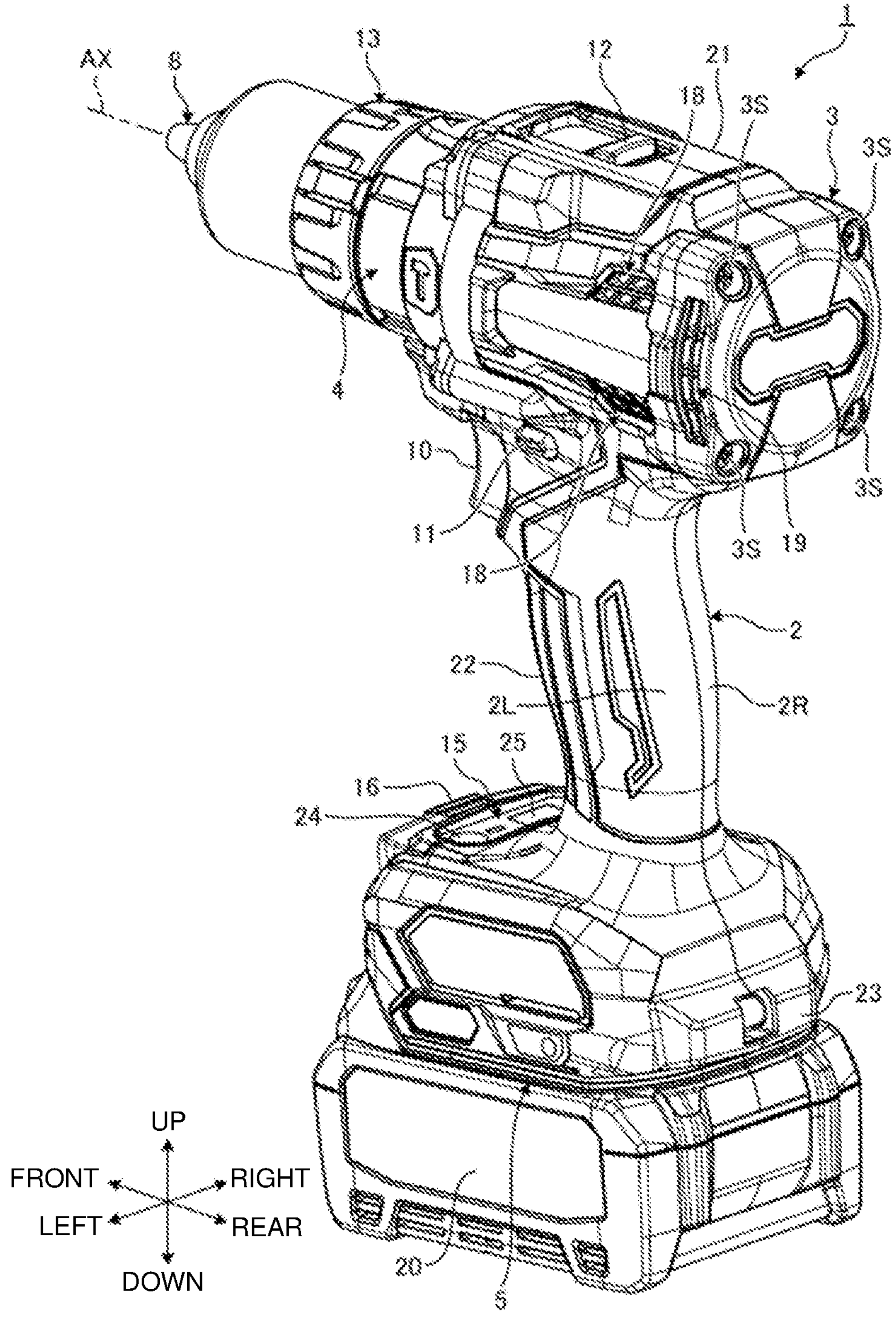
FIG. 2 is a perspective view of the driver drill according to the first embodiment as viewed from the rear.
Figure 3:
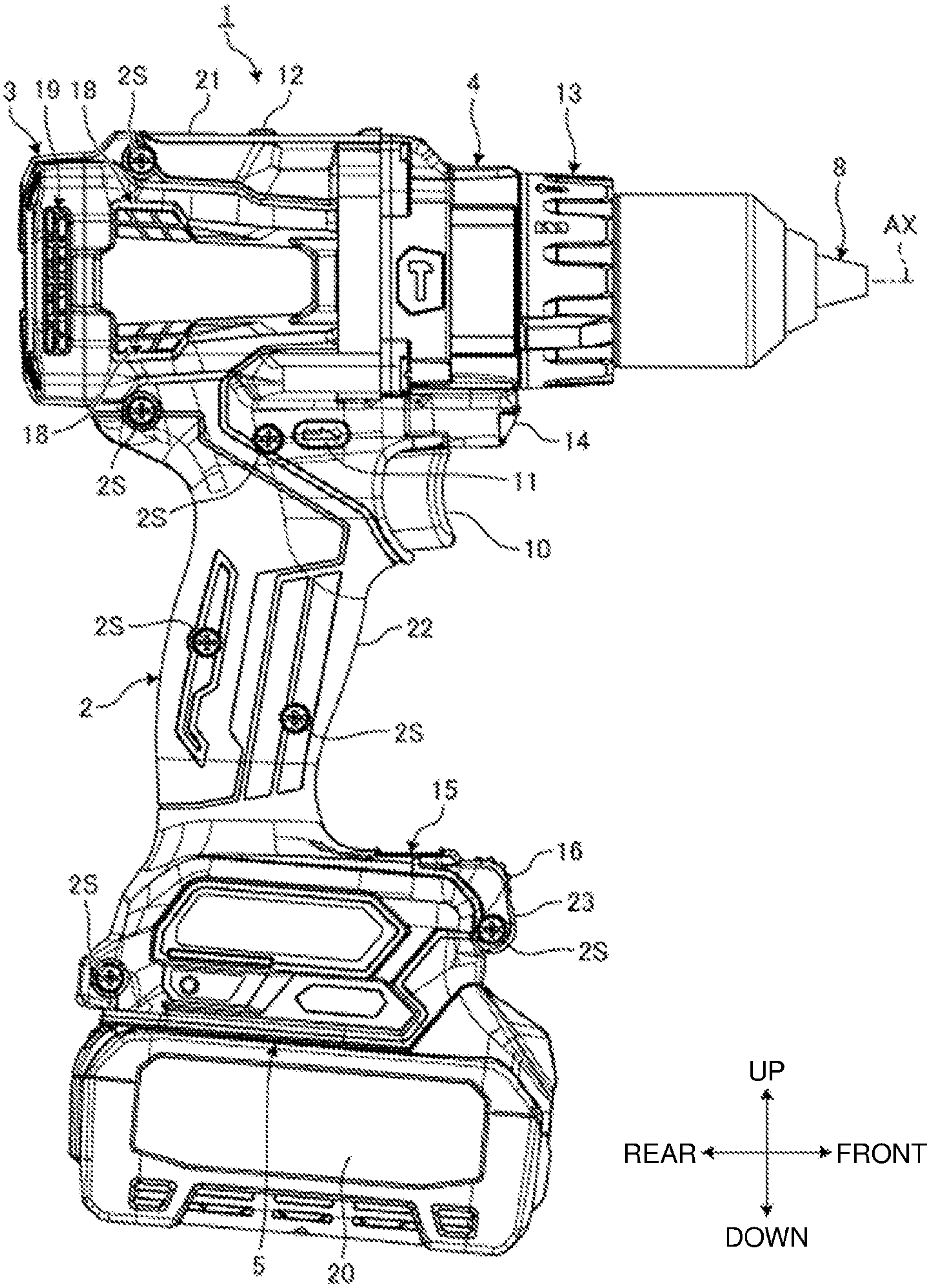
FIG. 3 is a side view of the driver drill according to the first embodiment.
Figure 4:
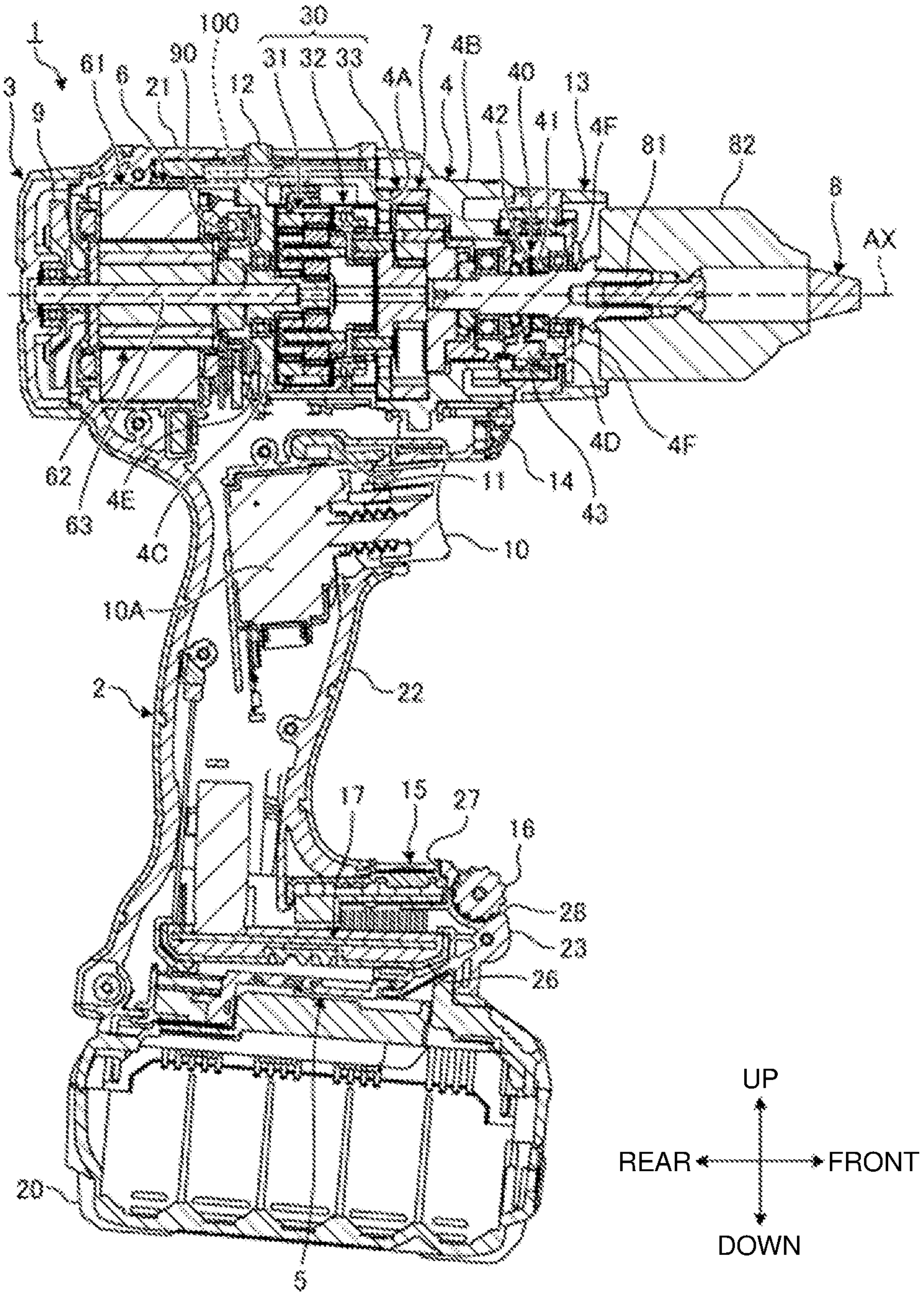
FIG. 4 is a sectional view of the driver drill according to the first embodiment.

FIG. 1 is a perspective view of a driver drill 1 according to the present embodiment as viewed from the front. FIG. 2 is a perspective view of the driver drill 1 as viewed from the rear. FIG. 3 is a side view of the driver drill 1. FIG. 4 is a sectional view of the driver drill 1. The driver drill 1 according to the present embodiment is a vibration driver drill.

As shown in FIGS. 1 to 4, the driver drill 1 includes a housing 2, a rear cover 3, a casing 4, a battery mount 5, a motor 6, a power transmission 7, an output unit 8, a fan 9, a trigger lever 10, a forward-reverse switch lever 11, a speed switch lever 12, a mode switch ring 13, a light 14, an interface panel 15, a dial 16, a controller board 17, a rotation sensor board 90, and a mode sensor board 100.

The housing 2 is formed from a synthetic resin. The housing 2 in the present embodiment is formed from nylon. The housing 2 includes a left housing 2L and a right housing 2R. The left and right housings 2L and 2R are fastened together with screws 2S to form the housing 2.

The housing 2 includes a motor compartment 21, a grip 22, and a battery holder 23.

The motor compartment 21 accommodates the motor 6. The motor compartment 21 is cylindrical.

The grip 22 is grippable by an operator. The grip 22 is located below the motor compartment 21. The grip 22 extends downward from the motor compartment 21. The trigger lever 10 is located in a front portion of the grip 22.

The battery holder 23 accommodates the controller board 17. The battery holder 23 is located under the grip 22. The battery holder 23 is connected to a lower end of the grip 22. The battery holder 23 has larger outer dimensions than the grip 22 in the front-rear and lateral directions.

The rear cover 3 is formed from a synthetic resin. The rear cover 3 in the present embodiment is formed from nylon. The rear cover 3 is located behind the motor compartment 21. The rear cover 3 accommodates the fan 9. The rear cover 3 covers a rear opening of the motor compartment 21. The rear cover 3 is fastened to the motor compartment 21 with four screws 3S.

The motor compartment 21 has inlets 18. The rear cover 3 has outlets 19. Air outside the housing 2 flows into an internal space of the housing 2 through the inlets 18. Air in the internal space of the housing 2 flows out of the housing 2 through the outlets 19.

The casing 4 accommodates the power transmission 7. The casing 4 includes a first casing 4A, a second casing 4B, a bracket plate 4C, and a stop plate 4D. The second casing 4B is located in front of the first casing 4A. The mode switch ring 13 is located in front of the second casing 4B. The first casing 4A is formed from a synthetic resin. The second casing 4B is formed from a metal. The second casing 4B in the present embodiment is formed from aluminum. The casing 4 is located in front of the motor compartment 21. The first casing 4A and the second casing 4B are cylindrical.

The first casing 4A is fixed to the rear end of the second casing 4B. The bracket plate 4C covers the opening at the rear end of the first casing 4A. The bracket plate 4C is fastened to the rear end of the first casing 4A with screws 4E. The stop plate 4D covers the opening at the front end of the second casing 4B. The stop plate 4D is fastened to the front end of the second casing 4B with screws 4F.

The casing 4 covers a front opening of the motor compartment 21. The first casing 4A is located inside the motor compartment 21. The second casing 4B is fastened to the motor compartment 21 with four screws 4S.

The battery mount 5 is located under the battery holder 23. The battery mount 5 is connected to a battery pack 20. The battery pack 20 is attached to the battery mount 5 in a detachable manner. The battery pack 20 includes a secondary battery. The battery pack 20 in the present embodiment includes a rechargeable lithium-ion battery. The battery pack 20 is attached to the battery mount 5 to power the driver drill 1. The motor 6 is driven by power supplied from the battery pack 20. The interface panel 15 and the controller board 17 operate on power supplied from the battery pack 20.

The motor 6 powers the driver drill 1. The motor 6 is a brushless inner-rotor motor. The motor 6 is accommodated in the motor compartment 21. The motor 6 includes a cylindrical stator 61 and a rotor 62 located inward from the stator 61. The rotor 62 rotates relative to the stator 61. The rotor 62 includes a rotor shaft 63 extending in the axial (front-rear) direction.

The power transmission 7 is located in front of the motor 6. The power transmission 7 is accommodated in the casing 4. The power transmission 7 connects the rotor shaft 63 and the output unit 8 together. The power transmission 7 transmits power generated by the motor 6 to the output unit 8. The power transmission 7 includes multiple gears.

The power transmission 7 includes a reducer 30 and a vibrator 40.

The reducer 30 reduces rotation of the rotor shaft 63 and rotates the output unit 8 at a lower rotational speed than the rotor shaft 63. The reducer 30 in the present embodiment includes a first planetary gear assembly 31, a second planetary gear assembly 32, and a third planetary gear assembly 33. The first planetary gear assembly 31 is at least partially located frontward from the motor 6. The second planetary gear assembly 32 is located frontward from the first planetary gear assembly 31. The third planetary gear assembly 33 is located frontward from the second planetary gear assembly 32. The first planetary gear assembly 31 is rotatable with a rotational force from the motor 6. The second planetary gear assembly 32 is rotatable with a rotational force from the first planetary gear assembly 31. The third planetary gear assembly 33 is rotatable with a rotational force from the second planetary gear assembly 32.

The vibrator 40 vibrates the output unit 8 in the axial direction. The vibrator 40 includes a first cam 41, a second cam 42, and a vibration switch ring 43.

The output unit 8 is located frontward from the motor 6. The output unit 8 rotates with a rotational force from the motor 6. The output unit 8 holding a tip tool rotates with a rotational force transmitted from the motor 6 through the power transmission 7. The output unit 8 includes a spindle 81 and a chuck 82. The spindle 81 rotates about the rotation axis AX with a rotational force transmitted from the motor 6. The chuck 82 receives the tip tool. The spindle 81 is at least partially located frontward from the third planetary gear assembly 33. The spindle 81 is connected to the third planetary gear assembly 33. The spindle 81 rotates with a rotational force from the motor 6 transmitted through the first planetary gear assembly 31, the second planetary gear assembly 32, and the third planetary gear assembly 33. The chuck 82 receives the tip tool such as a screwdriver bit or a drill bit in a detachable manner.

The fan 9 is located behind a rotor core 62A. The fan 9 generates an airflow for cooling the motor 6. The fan 9 is fixed to at least a part of the rotor 62. The fan 9 is fixed to a rear portion of the rotor shaft 63. As the rotor shaft 63 rotates, the fan 9 rotates together with the rotor shaft 63. Air outside the housing 2 thus flows into the internal space of the housing 2 through the inlets 18 and flows through the internal space of the housing 2 to cool the motor 6. The air passing through the internal space of the housing 2 flows out of the housing 2 through the outlets 19.

The trigger lever 10 is operable to activate the motor 6. The trigger lever 10 is located in an upper front portion of the grip 22. The trigger lever 10 has a front end protruding frontward from the front portion of the grip 22. The trigger lever 10 is movable in the front-rear direction. The trigger lever 10 is operable by the operator. The trigger lever 10 moves backward to activate the motor 6. When the trigger lever 10 stops being operated, the motor 6 is stopped.

The forward-reverse switch lever 11 is operable to change the rotation direction of the motor 6. The forward-reverse switch lever 11 is located in an upper portion of the grip 22.

The forward-reverse switch lever 11 has a left end protruding leftward from a left portion of the grip 22. The forward-reverse switch lever 11 has a right end protruding rightward from a right portion of the grip 22. The forward-reverse switch lever 11 is movable in the lateral direction. The forward-reverse switch lever 11 is operable by the operator. The forward-reverse switch lever 11 moves leftward to rotate the motor 6 forward. The forward-reverse switch lever 11 moves rightward to rotate the motor 6 reversely. This operation thus changes the rotation direction of the spindle 81.

The speed switch lever 12 is operable to change the speed mode of the reducer 30. The speed switch lever 12 is located in an upper portion of the motor compartment 21. The speed switch lever 12 is movable in the front-rear direction relative to the motor compartment 21. The speed switch lever 12 is operable by the operator. The speed mode of the reducer 30 includes a high-speed mode, a medium-speed mode, and a low-speed mode. In the high-speed mode, the output unit 8 rotates at a high speed. In the medium-speed mode, the output unit 8 rotates at medium speed. In the low-speed mode, the output unit 8 rotates at a low speed. The movable range of the speed switch lever 12 is defined in the front-rear direction. The speed switch lever 12 moves to a first position P1 at the rear in the movable range to set the reducer 30 to the high-speed mode. The speed switch lever 12 moves to a second position P2 in the middle in the movable range to set the reducer 30 to the medium-speed mode. The speed switch lever 12 moves to a third position P3 at the front in the movable range to set the reducer 30 to the low-speed mode (refer to FIG. 20).

The mode switch ring 13 is operable to change the operation mode of the vibrator 40. The mode switch ring 13 is located in front of the casing 4. The mode switch ring 13 is rotatable. The mode switch ring 13 is operable by the operator. The operation mode of the vibrator 40 includes a vibration mode and a non-vibration mode. In the vibration mode, the output unit 8 vibrates in the axial direction. In the non-vibration mode, the output unit 8 does not vibrate in the axial direction. The mode switch ring 13 at a vibration mode position in the rotation direction sets the vibrator 40 to the vibration mode. The mode switch ring 13 at a non-vibration mode position in the rotation direction sets the vibrator 40 to the non-vibration mode. The non-vibration mode includes a screwdriver (screwing) mode and a drill mode.

Figure 6:
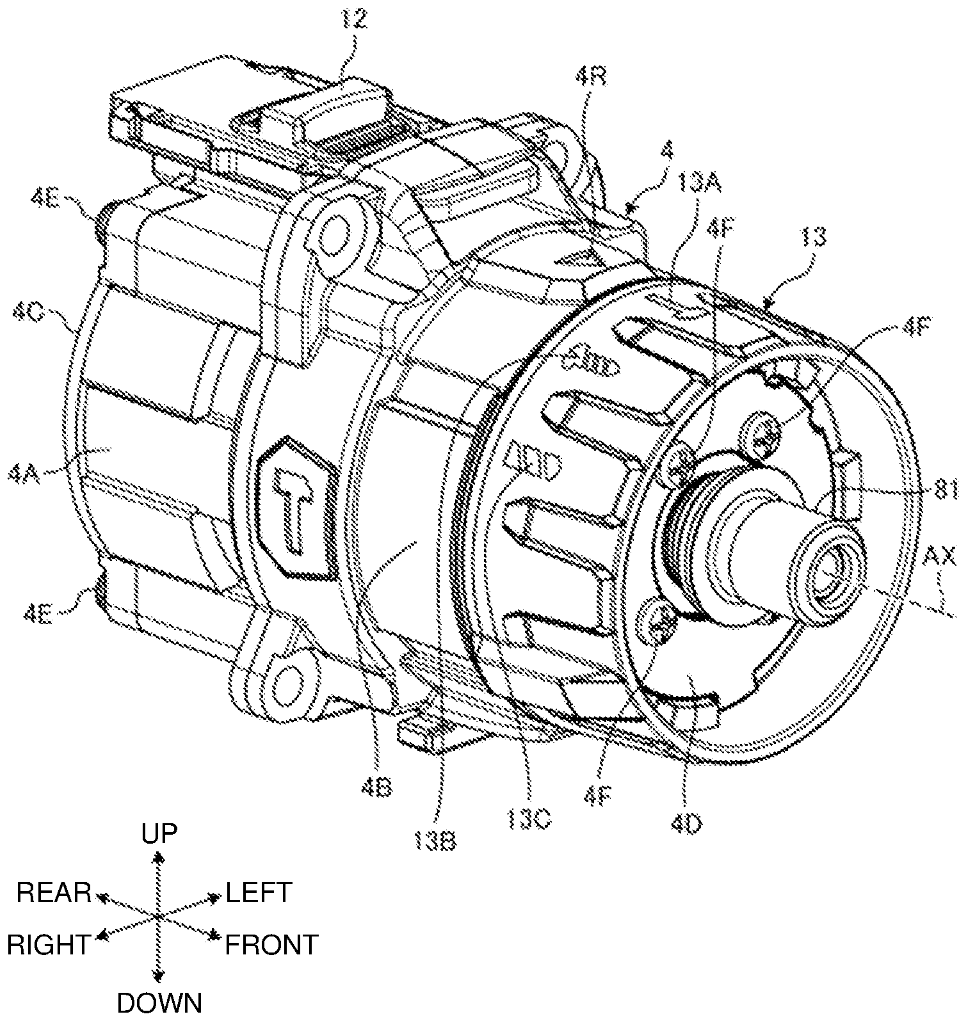
FIG. 6 is a partial perspective view of the driver drill according to the first embodiment as viewed from the front.

As shown in FIG. 6, the mode switch ring 13 includes a first symbol 13A, a second symbol 13B, and a third symbol 13C. A reference symbol 4R is located in an upper front portion of the casing 4. In response to the mode switch ring 13 being operated to align the first symbol 13A with the reference symbol 4R in the rotation direction, the vibrator 40 is set to the vibration (vibration drill) mode. In response to the mode switch ring 13 being operated to align the second symbol 13B with the reference symbol 4R in the rotation direction, the vibrator 40 is set to the screwdriver mode included in the non-vibration mode. In response to the mode switch ring 13 being operated to align the third symbol 13C with the reference symbol 4R in the rotation direction, the vibrator 40 is set to the drill mode included in the non-vibration mode.

The light 14 emits illumination light to illuminate ahead of the driver drill 1. The light 14 includes, for example, a light-emitting diode (LED). The light 14 is located under a front portion of the motor compartment 21. The light 14 is located above the trigger lever 10.

The interface panel 15 is located on the upper surface of the battery holder 23. The interface panel 15 includes an operation unit 24 and a display 25. The interface panel 15 is a plate. The operation unit 24 includes an operation button. The display 25 is, for example, a segment display including multiple segment light emitters, a flat display panel such as a liquid crystal display, or an indicator display including multiple LEDs.

The battery holder 23 has a panel opening 27. The panel opening 27 is formed in the upper surface of the battery holder 23 and frontward from the grip 22. The interface panel 15 is at least partially received in the panel opening 27.

The operation unit 24 is operable to change the drive mode of the motor 6. The operation unit 24 is operable by the operator. The motor 6 has a drill mode and a clutch mode as its drive mode. In the drill mode, the motor 6 is driven independently of the torque applied to the motor 6. In the clutch mode, the motor 6 is stopped in response to torque exceeding a torque threshold applied to the motor 6.

The dial 16 is operable to change a drive condition of the motor 6. The dial 16 is located in a front portion of the battery holder 23. The dial 16 is supported by the battery holder 23 in a rotatable manner. The dial 16 is rotatable by 360° or greater. The dial 16 is operable by the operator. The drive condition of the motor 6 includes the torque threshold. The dial 16 is operable to change the torque threshold in the clutch mode set by the operation unit 24.

The battery holder 23 has a dial opening 28. The dial opening 28 is formed in a front right portion of the battery holder 23. The dial 16 is at least partially received in the dial opening 28.

The controller board 17 outputs a control command for controlling the motor 6. The controller board 17 is at least partially accommodated in a controller case 26. The controller board 17 is held by the controller case 26 and is accommodated in the battery holder 23. The controller board 17 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a transistor, a capacitor, and a resistor.

The controller board 17 sets the drive condition of the motor 6 based on an operation on the dial 16. The drive condition of the motor 6 includes the torque threshold. In the clutch mode, the controller board 17 sets a torque threshold based on the operation on the dial 16.

In the clutch mode, the controller board 17 stops the motor 6 in response to torque exceeding the set torque threshold being applied to the motor 6.

The controller board 17 displays the set drive condition of the motor 6 on the display 25. The controller board 17 displays the set torque threshold on the display 25.

The rotation sensor board 90 includes a circuit board on which multiple rotation sensors that detect rotation of the rotor 62 are mounted. The controller board 17 supplies a drive current to the motor 6 based on detection data from the rotation sensors.

The mode sensor board 100 includes a circuit board on which multiple mode sensors that detect the position of the speed switch lever 12 in the front-rear direction are mounted. In the clutch mode, the controller board 17 stops the motor 6 based on detection data from the mode sensors in response to torque exceeding the set torque threshold being applied to the motor 6.

Motor and Power Transmission

Figure 5:
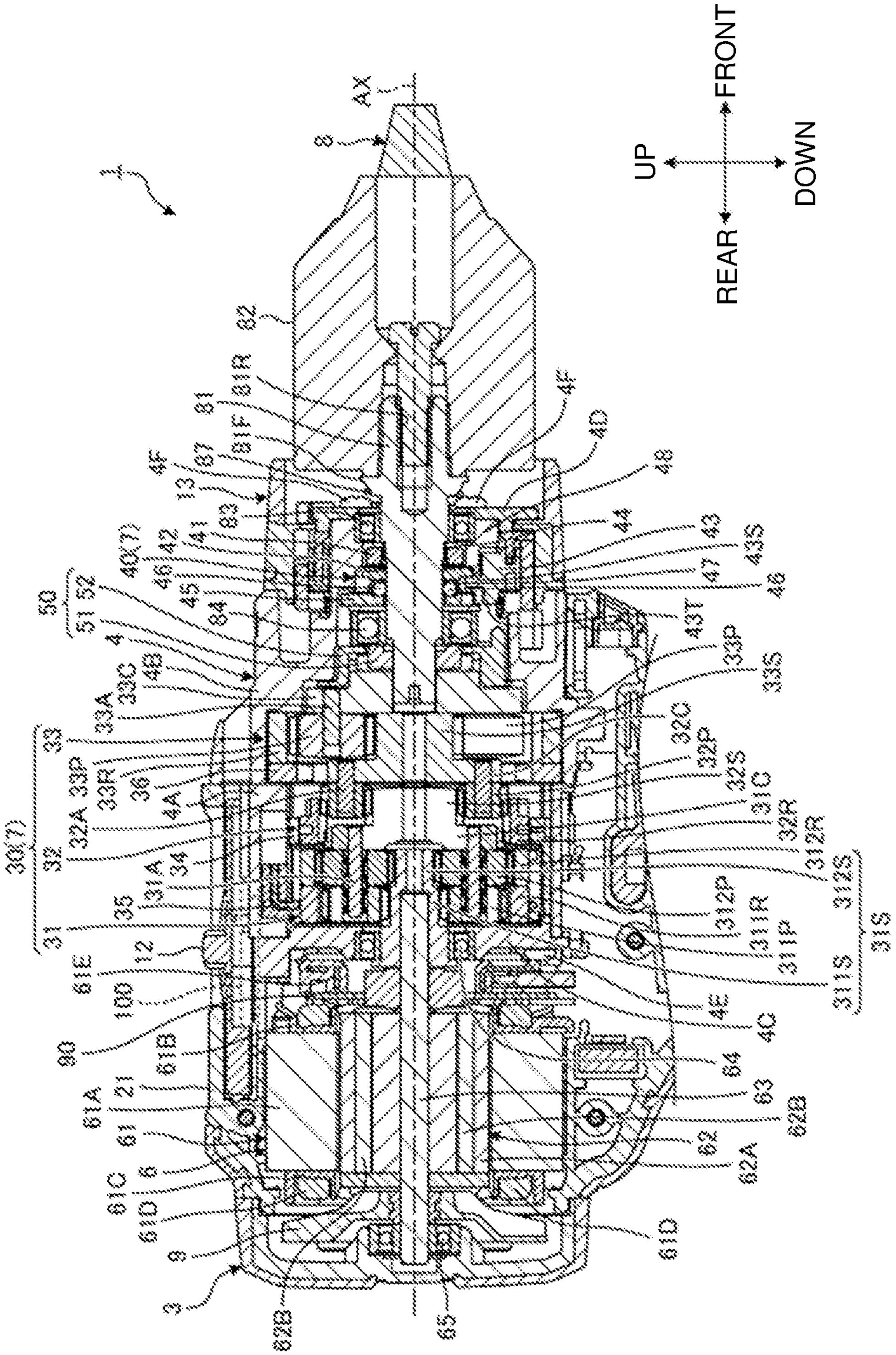
FIG. 5 is a partial sectional view of the driver drill according to the first embodiment.

FIG. 5 is a partial sectional view of the driver drill 1 according to the present embodiment. As shown in FIG. 5, the motor 6 includes the cylindrical stator 61 and the rotor 62 located inward from the stator 61. The rotor 62 includes the rotor shaft 63 extending in the axial direction.

The stator 61 includes a stator core 61A, a front insulator 61B, a rear insulator 61C, multiple coils 61D, and a short-circuiting member 61E. The stator core 61A includes multiple steel plates stacked on one another. The front insulator 61B is located in front of the stator core 61A. The rear insulator 61C is located behind the stator core 61A. The coils 61D are wound around the stator core 61A with the front insulator 61B and the rear insulator 61C in between. The short-circuiting member 61E is supported by the front insulator 61B. The short-circuiting member 61E connects the multiple coils 61D with fusing terminals. The short-circuiting member 61E is connected to the controller board 17 with lead wires.

The rotor 62 rotates about the rotation axis AX. The rotor 62 includes the rotor shaft 63, the rotor core 62A, and multiple permanent magnets 62B. The rotor core 62A surrounds the rotor shaft 63. The multiple permanent magnets 62B are held by the rotor core 62A. The rotor core 62A is cylindrical. The rotor core 62A includes multiple steel plates stacked on one another. The rotor core 62A has multiple through-holes extending in the axial direction. The through-holes are located circumferentially. The permanent magnets 62B are located in the respective through-holes in the rotor core 62A.

The rotation sensor board 90 includes the circuit board on which the multiple rotation sensors that detect rotation of the rotor 62 are mounted. The rotation sensor board 90 is attached to the front insulator 61B. The rotation sensors mounted on the rotation sensor board 90 include magnetic sensors that detect the magnetic fields of the permanent magnets 62B. The magnetic sensors are, for example, Hall sensors each including a Hall device. The rotation sensors detect the magnetic fields of the permanent magnets 62B to detect the rotation of the rotor 62. The controller board 17 supplies a drive current to the coils 61D based on the detection data from the rotation sensors.

The rotor shaft 63 rotates about the rotation axis AX. The rotation axis AX of the rotor shaft 63 is aligned with the rotation axis of the output unit 8. The rotor shaft 63 includes a front portion supported by a bearing 64 in a rotatable manner. The rotor shaft 63 includes a rear portion supported by a bearing 65 in a rotatable manner. The bearing 64 is held by the bracket plate 4C located in front of the stator 61. The bearing 65 is held by the rear cover 3. The rotor shaft 63 has its front end located frontward from the bearing 64. The rotor shaft 63 has its front end located in an internal space of the casing 4.

A pinion gear 31S is located at the front end of the rotor shaft 63. The pinion gear 31S serves as a sun gear in the first planetary gear assembly 31. The pinion gear 31S is rotated by the motor 6. The pinion gear 31S includes a larger-diameter portion 311S and a smaller-diameter portion 312S. The smaller-diameter portion 312S is located frontward from the larger-diameter portion 311S. The rotor shaft 63 is connected to the first planetary gear assembly 31 in the reducer 30 with the pinion gear 31S.

The first planetary gear assembly 31 includes planetary gears 311P, planetary gears 312P, a first carrier 31C, an internal gear 311R, and an internal gear 312R. The planetary gears 312P are located frontward from the planetary gears 311P. The first carrier 31C supports the planetary gears 311P and the planetary gears 312P. The internal gear 311R surrounds the planetary gears 311P. The internal gear 312R surrounds the planetary gears 312P.

The second planetary gear assembly 32 includes a sun gear 32S, multiple planetary gears 32P, a second carrier 32C, and an internal gear 32R. The planetary gears 32P surround the sun gear 32S. The second carrier 32C supports the planetary gears 32P. The internal gear 32R surrounds the planetary gears 32P.

The third planetary gear assembly 33 includes a sun gear 33S, multiple planetary gears 33P, a third carrier 33C, and an internal gear 33R. The planetary gears 33P surround the sun gear 33S. The third carrier 33C supports the planetary gears 33P. The internal gear 33R surrounds the planetary gears 33P.

The spindle 81 is connected to the third carrier 33C with a spindle locking assembly 50. The spindle locking assembly 50 includes a lock cam 51 and a lock ring 52. The lock cam 51 surrounds the spindle 81. The lock ring 52 supports the lock cam 51 in a rotatable manner. The lock ring 52 is located inside the second casing 4B. The lock ring 52 is fixed to the second casing 4B. As the third carrier 33C rotates, the spindle 81 rotates.

The spindle 81 is supported by a bearing 83 and a bearing 84 in a rotatable manner. In this state, the spindle 81 is movable in the front-rear direction.

The spindle 81 includes a flange 81F. A coil spring 87 is located between the flange 81F and the bearing 83. The flange 81F comes in contact with the front end of the coil spring 87. The coil spring 87 generates an elastic force for moving the spindle 81 forward.

The chuck 82 can hold the tip tool. The chuck 82 is connected to a front portion of the spindle 81. The spindle 81 has a threaded hole 81R on its front end. The chuck 82 rotates as the spindle 81 rotates. The chuck 82 holding the tip tool rotates.

The first cam 41 and the second cam 42 in the vibrator 40 are both located inside the second casing 4B. The first cam 41 and the second cam 42 are located between the bearing 83 and the bearing 84 in the front-rear direction.

The first cam 41 is annular. The first cam 41 surrounds the spindle 81. The first cam 41 is fixed to the spindle 81. The first cam 41 rotates together with the spindle 81. The first cam 41 includes cam teeth on its rear surface. The first cam 41 is supported by a stop ring 44. The stop ring 44 surrounds the spindle 81. The stop ring 44 is located between the first cam 41 and the bearing 83 in the front-rear direction.

The second cam 42 is annular. The second cam 42 is located behind the first cam 41. The second cam 42 surrounds the spindle 81. The second cam 42 is rotatable relative to the spindle 81. The second cam 42 includes cam teeth on its front surface. The cam teeth on the front surface of the second cam 42 mesh with the cam teeth on the rear surface of the first cam 41. The second cam 42 includes a tab on its rear surface.

A support ring 45 is located between the second cam 42 and the bearing 84 in the front-rear direction. The support ring 45 is located inside the second casing 4B. The support ring 45 is fixed to the second casing 4B. The support ring 45 includes multiple steel balls 46 on its front surface. A washer 47 is located between the steel balls 46 and the second cam 42. The second cam 42 is rotatable while being restricted from moving forward and backward in a space defined by the support ring 45 and the washer 47.

The vibration switch ring 43 switches between the vibration mode and the non-vibration mode. The mode switch ring 13 is connected to the vibration switch ring 43 with a cam ring 48 in between. The mode switch ring 13 is rotatable together with the cam ring 48. The vibration switch ring 43 is movable in the front-rear direction. The vibration switch ring 43 includes a protrusion 43T. The protrusion 43T is placed in a guide hole in the second casing 4B. The vibration switch ring 43 is movable in the front-rear direction while being guided along the guide hole in the second casing 4B. The protrusion 43T restricts the vibration switch ring 43 from rotating. The operator operates the mode switch ring 13 to move the vibration switch ring 43 in the front-rear direction. The vibration switch ring 43 moves in the front-rear direction between an advanced position and a retracted position to switch between the vibration mode and the non-vibration mode. The retracted position is located rearward from the advanced position. The mode switch ring 13 is operable to switch between the vibration mode and the non-vibration mode.

The vibration mode includes the state of the second cam 42 being restricted from rotating. The non-vibration mode includes the state of the second cam 42 being rotatable. When the vibration switch ring 43 moves to the advanced position, the second cam 42 is restricted from rotating. When the vibration switch ring 43 moves to the retracted position, the second cam 42 becomes rotatable.

In the vibration mode, the vibration switch ring 43 at the advanced position is at least partially in contact with the second cam 42. This restricts the second cam 42 from rotating. When the motor 6 is driven in this state, the first cam 41 fixed to the spindle 81 rotates in contact with the cam teeth on the second cam 42. The spindle 81 thus rotates while vibrating in the front-rear direction.

In the non-vibration mode, the vibration switch ring 43 at the retracted position is separate from the second cam 42. This allows the second cam 42 to rotate. When the motor 6 is driven in this state, the second cam 42 rotates together with the first cam 41 and the spindle 81. The spindle 81 thus rotates without vibrating in the front-rear direction.

The vibration switch ring 43 surrounds the first cam 41 and the second cam 42. The vibration switch ring 43 includes an opposing portion 43S facing the rear surface of the second cam 42. The opposing portion 43S protrudes radially inward from a rear portion of the vibration switch ring 43.

When the mode switch ring 13 is operated to move the vibration switch ring 43 to the advanced position, the tab on the rear surface of the second cam 42 is in contact with the opposing portion 43S of the vibration switch ring 43. This restricts the second cam 42 from rotating. In this manner, the mode switch ring 13 is operated to move the vibration switch ring 43 to the advanced position and to switch the vibrator 40 to the vibration mode.

When the mode switch ring 13 is operated to move the vibration switch ring 43 to the retracted position, the opposing portion 43S of the vibration switch ring 43 is separate from the second cam 42. This allows the second cam 42 to rotate. In this manner, the mode switch ring 13 is operated to move the vibration switch ring 43 to the retracted position and to switch the vibrator 40 to the non-vibration mode.

Reducer

Figure 7:
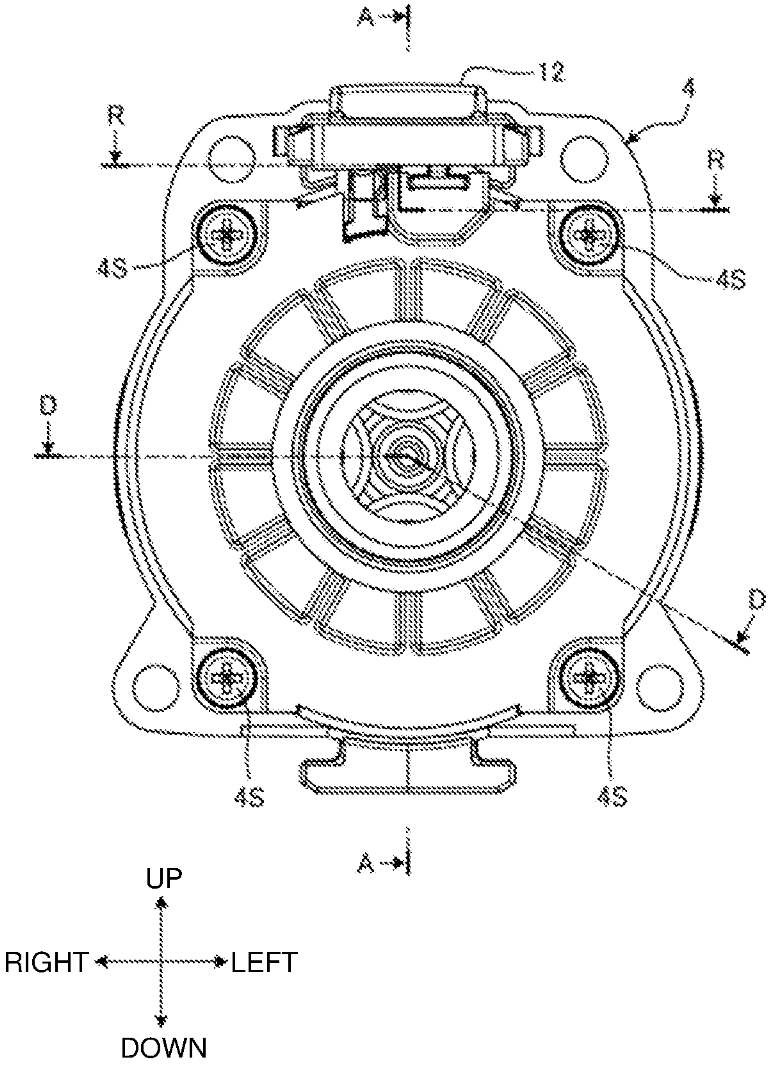
FIG. 7 is a partial front view of the driver drill according to the first embodiment.
Figure 8:
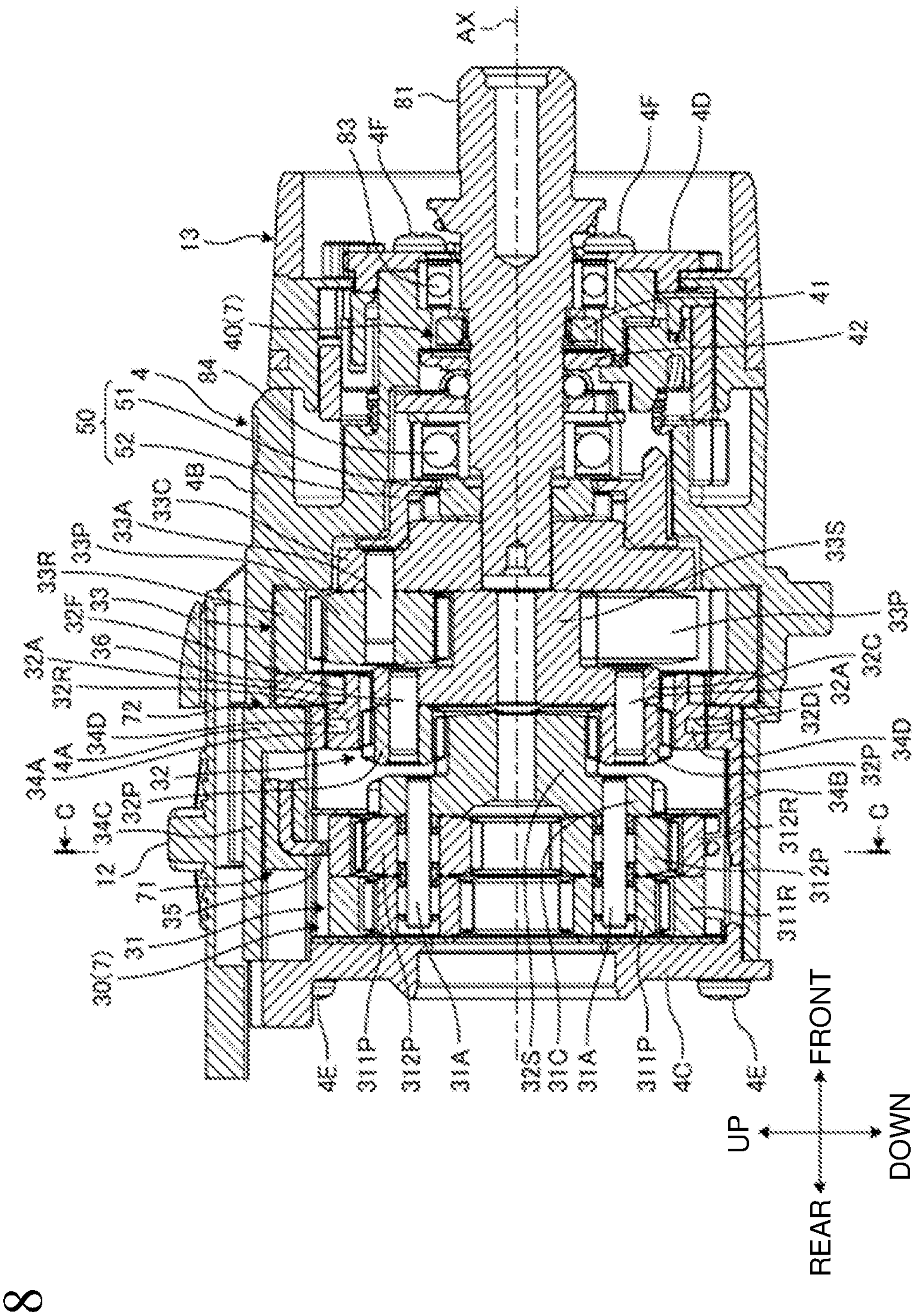
FIG. 8 is a sectional view of a power transmission in the first embodiment.
Figure 9:
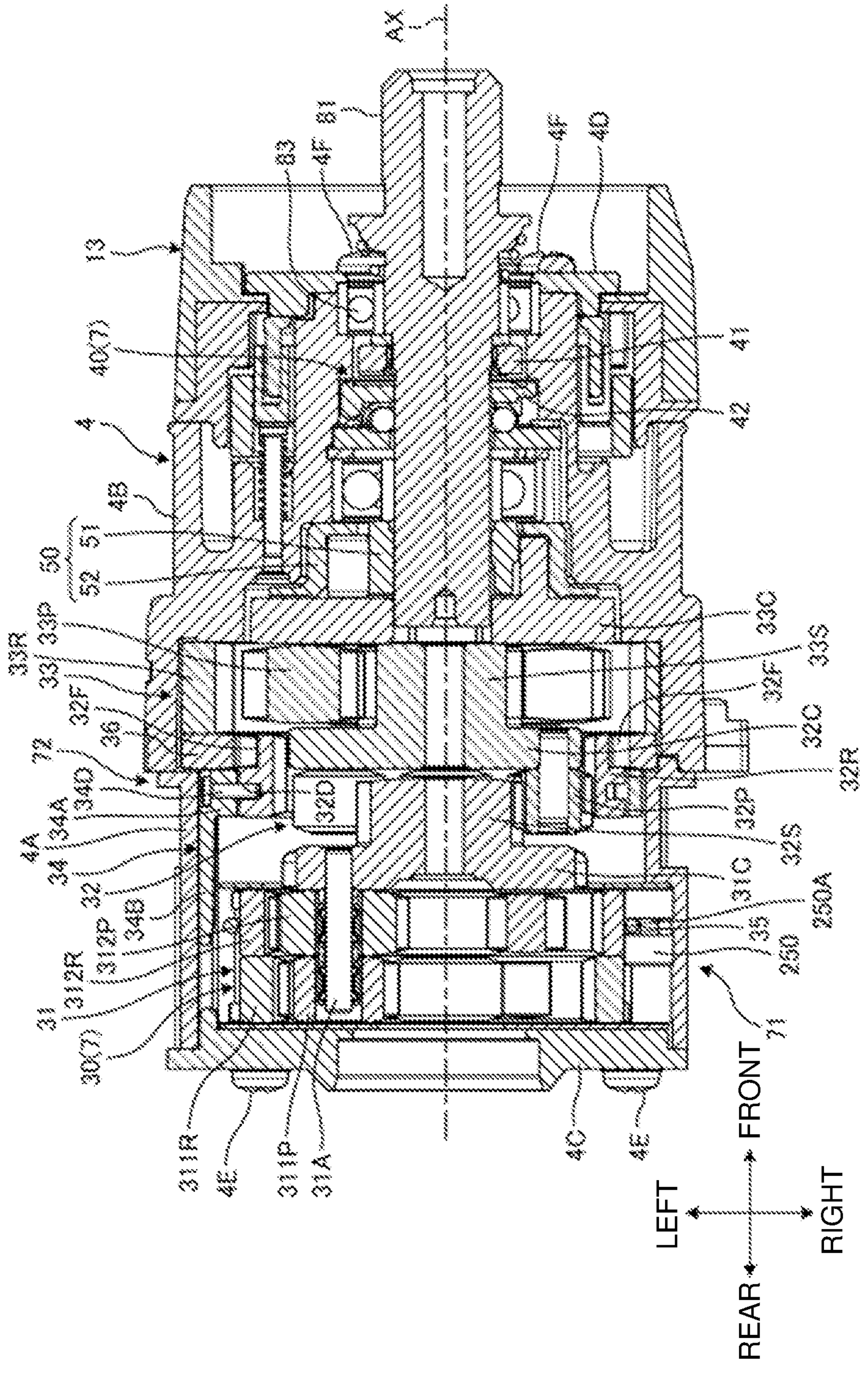
FIG. 9 is a sectional view of the power transmission in the first embodiment.
Figure 10:
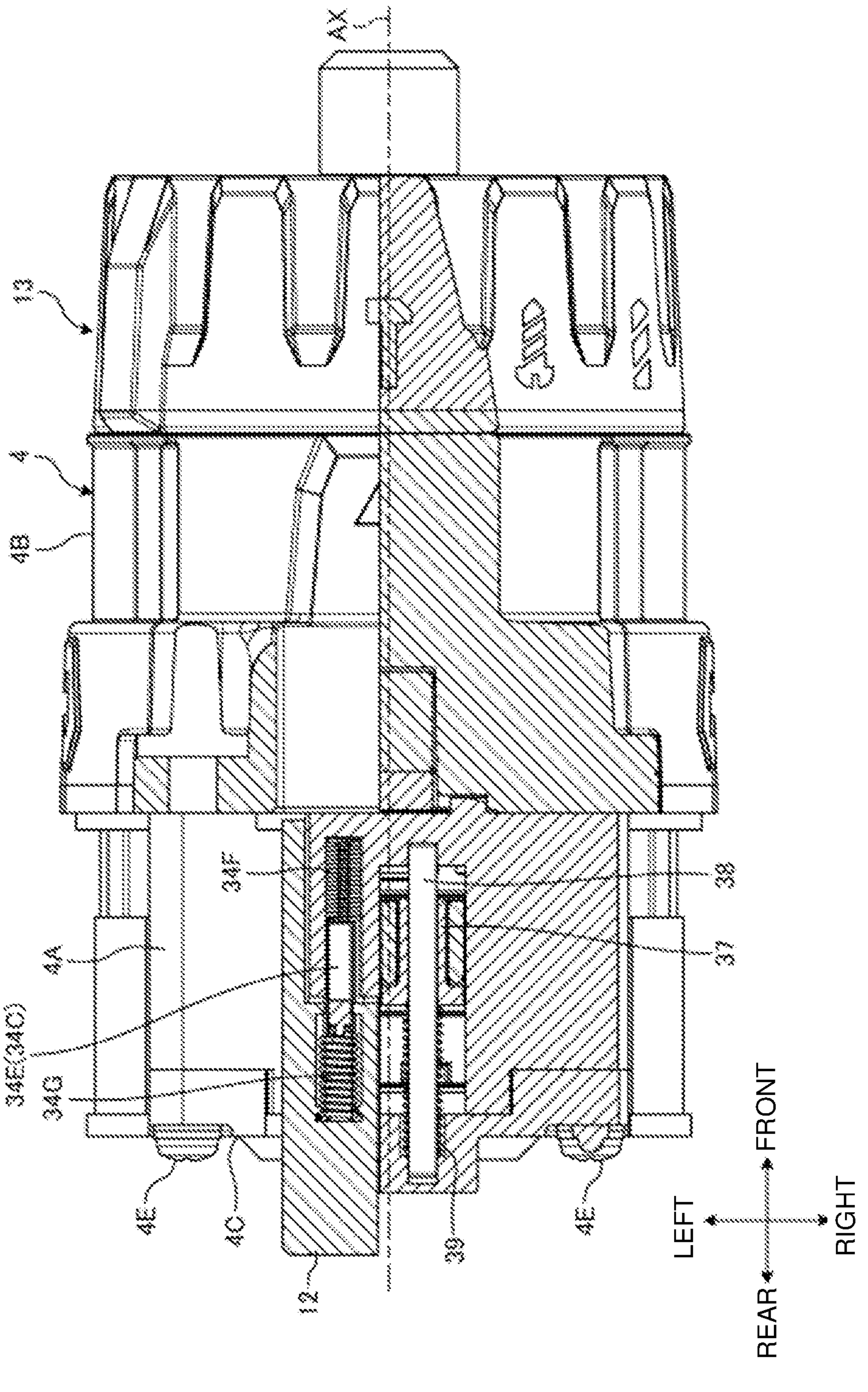
FIG. 10 is a sectional view of the power transmission in the first embodiment.

FIG. 6 is a partial perspective view of the driver drill 1 according to the present embodiment as viewed from the front. FIG. 7 is a partial front view of the driver drill 1. FIG. 8 is a sectional view of the power transmission 7, taken along line A-A as viewed in the direction indicated by arrows in FIG. 7. FIG. 9 is a sectional view of the power transmission 7, taken along line D-D as viewed in the direction indicated by arrows in FIG. 7. FIG. 10 is a sectional view of the power transmission 7, taken along line R-R as viewed in the direction indicated by arrows in FIG. 7.

The casing 4 accommodates the power transmission 7. The casing 4 includes the first casing 4A, the second casing 4B, the bracket plate 4C, and the stop plate 4D. The second casing 4B is located in front of the first casing 4A. The speed switch lever 12 is located above the first casing 4A. The mode switch ring 13 is located in front of the second casing 4B.

The first casing 4A is fixed to the rear end of the second casing 4B. The bracket plate 4C covers the opening at the rear end of the first casing 4A. The bracket plate 4C is fastened to the rear end of the first casing 4A with the screws 4E. The stop plate 4D covers the opening at the front end of the second casing 4B. The stop plate 4D is fastened to the front end of the second casing 4B with the screws 4F.

As described with reference to FIG. 5, the pinion gear 31S includes the larger-diameter portion 311S and the smaller-diameter portion 312S.

The first planetary gear assembly 31 includes the planetary gears 311P, the planetary gears 312P, the first carrier 31C, the internal gear 311R, and the internal gear 312R. The planetary gears 312P are located frontward from the planetary gears 311P. The first carrier 31C supports the planetary gears 311P and the planetary gears 312P. The internal gear 311R surrounds the planetary gears 311P. The internal gear 312R surrounds the planetary gears 312P.

The planetary gears 311P (first planetary gears) surround the larger-diameter portion 311S of the pinion gear 31S. The planetary gears 312P (second planetary gears) surround the smaller-diameter portion 312S of the pinion gear 31S. The first carrier 31C supports the planetary gears 311P and the planetary gears 312P. The internal gear 311R (first internal gear) surrounds the planetary gears 311P. The internal gear 312R (second internal gear) surrounds the planetary gears 312P. Each planetary gear 311P has a smaller outer diameter than the corresponding planetary gear 312P. Pins 31A are located on the first carrier 31C. The planetary gears 311P and the planetary gears 312P are supported by the corresponding pins 31A in a rotatable manner. The first carrier 31C supports the planetary gears 311P and the planetary gears 312P with the corresponding pins 31A in a rotatable manner. The first carrier 31C includes a gear on its outer periphery.

The second planetary gear assembly 32 includes the sun gear 32S, the multiple planetary gears 32P, the second carrier 32C, and the internal gear 32R. The planetary gears 32P surround the sun gear 32S. The second carrier 32C supports the planetary gears 32P. The internal gear 32R surrounds the planetary gears 32P. The sun gear 32S is located in front of the first carrier 31C. The sun gear 32S has a smaller diameter than the first carrier 31C. The first carrier 31C is integral with the sun gear 32S. The first carrier 31C and the sun gear 32S rotate together. Pins 32A are located on the second carrier 32C. The planetary gears 32P are supported by the corresponding pins 32A in a rotatable manner. The second carrier 32C supports the planetary gears 32P with the corresponding pins 32A in a rotatable manner.

The third planetary gear assembly 33 includes the sun gear 33S, the multiple planetary gears 33P, the third carrier 33C, and the internal gear 33R. The planetary gears 33P surround the sun gear 33S. The third carrier 33C supports the planetary gears 33P. The internal gear 33R surrounds the planetary gears 33P. The sun gear 33S is located in front of the second carrier 32C. The sun gear 33S has a smaller diameter than the second carrier 32C. The second carrier 32C is integral with the sun gear 33S. The second carrier 32C and the sun gear 33S rotate together. Pins 33A are located on the third carrier 33C. The planetary gears 33P are supported by the corresponding pins 33A in a rotatable manner. The third carrier 33C supports the planetary gears 33P with the corresponding pins 33A in a rotatable manner.

Figure 11:
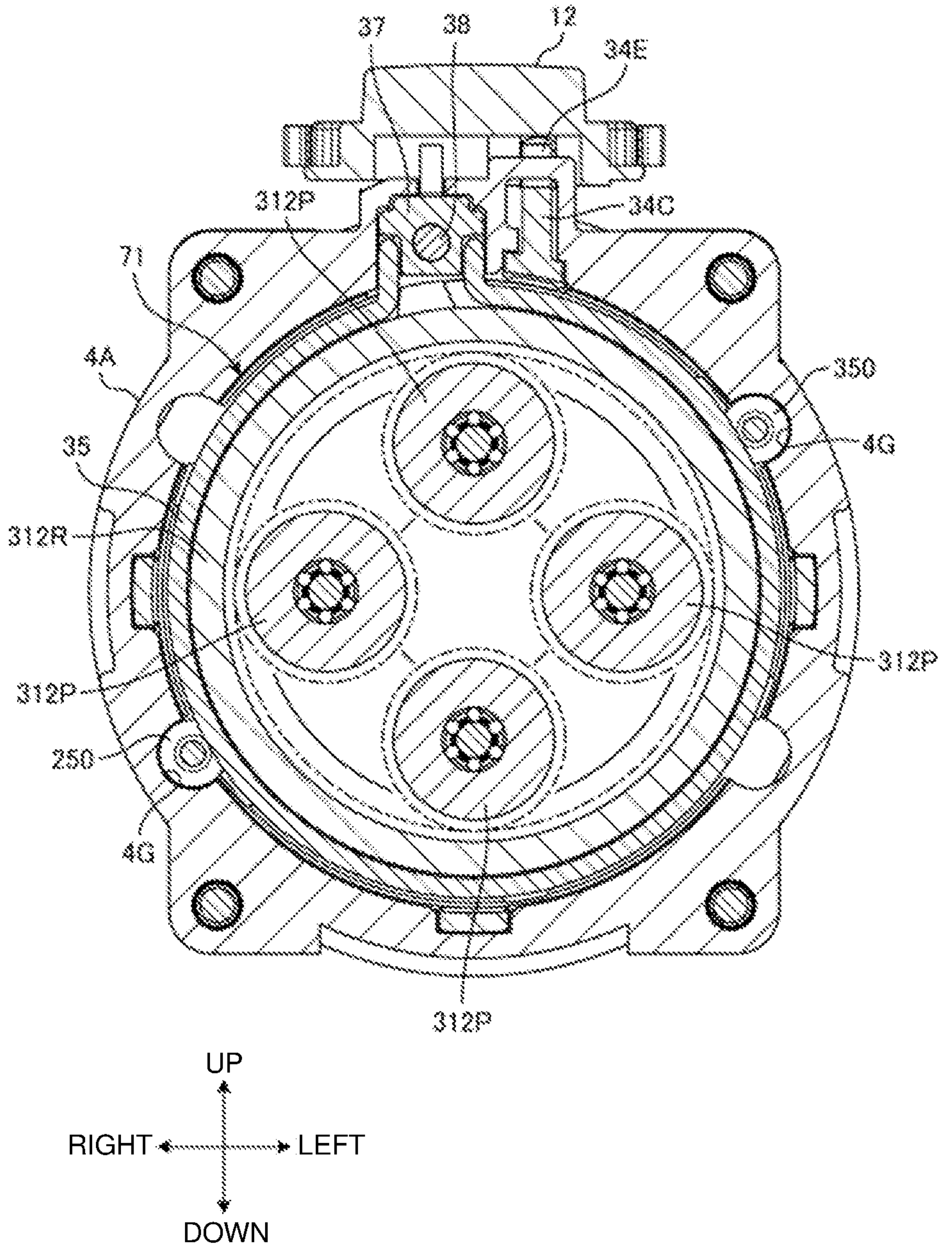
FIG. 11 is a sectional view of a reducer in the first embodiment.
Figure 12:
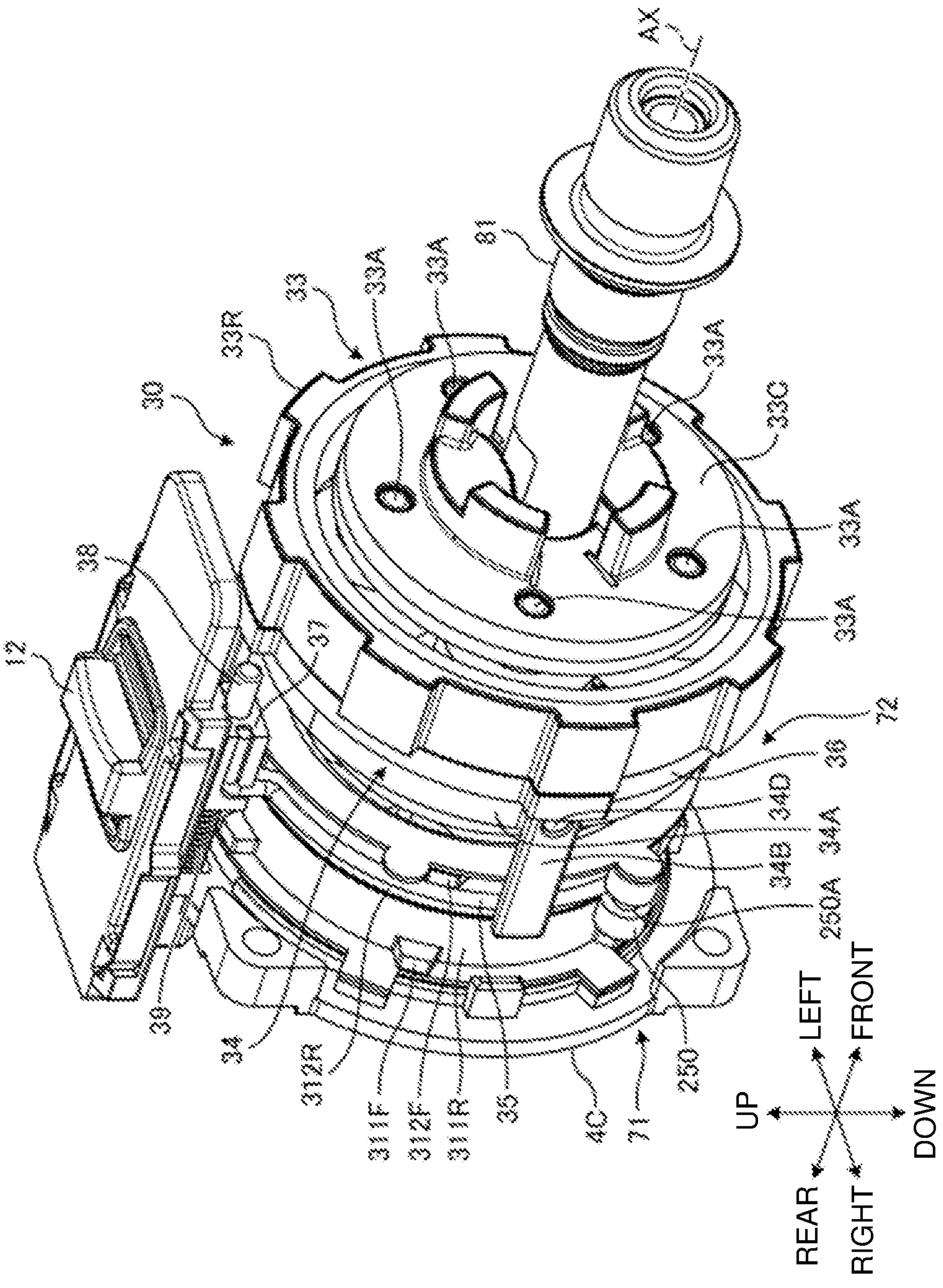
FIG. 12 is a perspective view of the reducer in the first embodiment as viewed from the right front.
Figure 13:
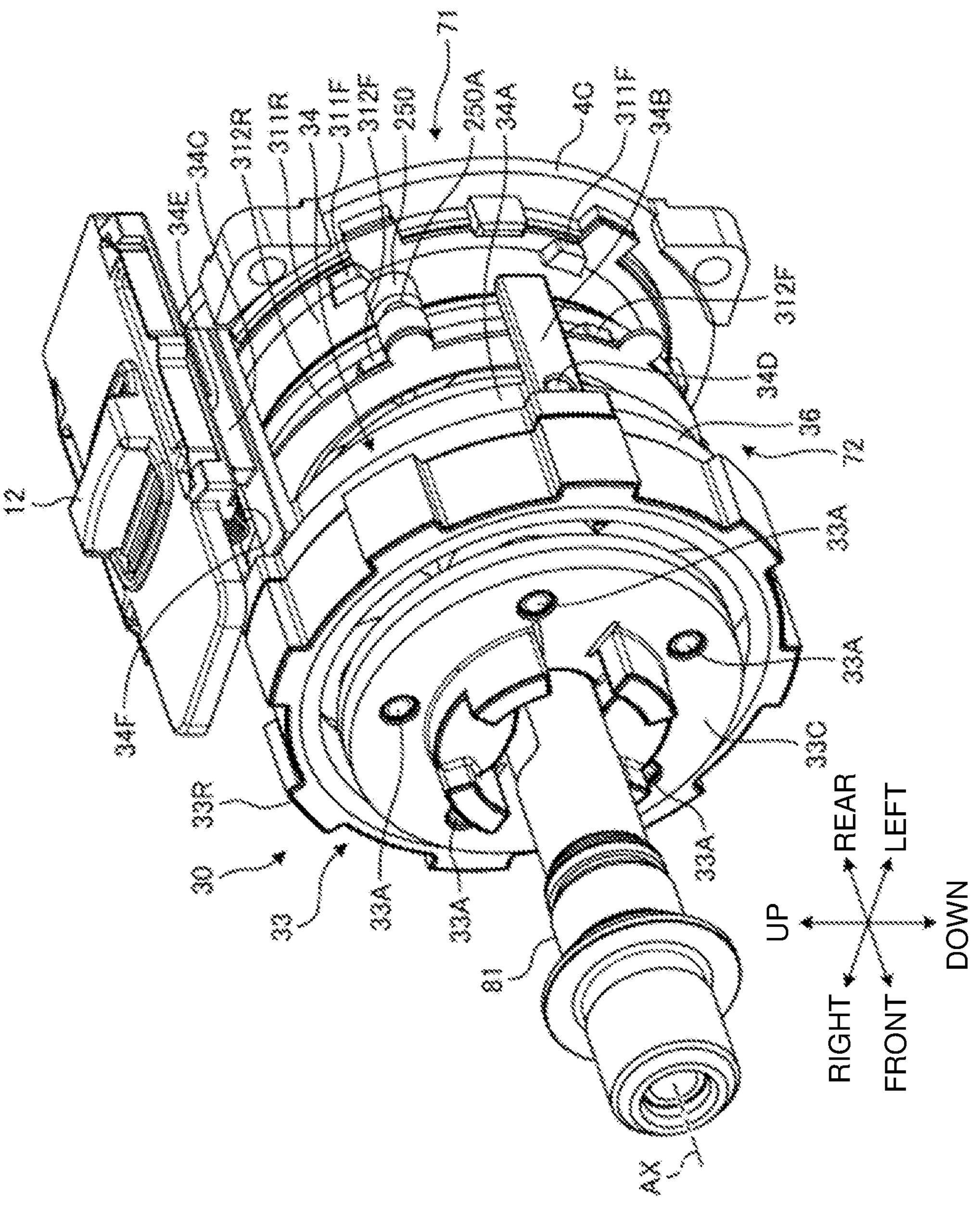
FIG. 13 is a perspective view of the reducer in the first embodiment as viewed from the left front.

FIG. 11 is a sectional view of the reducer 30 in the present embodiment, taken along line C-C as viewed in the direction indicated by arrows in FIG. 8. FIG. 12 is a perspective view of the reducer 30 as viewed from the right front. FIG. 13 is a perspective view of the reducer 30 as viewed from the left front.

As shown in FIGS. 8 to 12, the reducer 30 includes a first speed switcher 71 and a second speed switcher 72.

The first speed switcher 71 switches between a first reduction mode and a second reduction mode. In the first reduction mode, rotation of the internal gear 312R in the first planetary gear assembly 31 is restricted, and rotation of the internal gear 311R is allowed. In the second reduction mode, the rotation of the internal gear 311R in the first planetary gear assembly 31 is restricted, and the rotation of the internal gear 312R is allowed.

The first speed switcher 71 includes an annular member 35 and multiple cam pins 250.

The annular member 35 is connected to the cam pins 250. The annular member 35 is movable in the front-rear direction inside the first casing 4A. The annular member 35 moves forward and enters the first reduction mode. The annular member 35 moves backward and enters the second reduction mode.

In the present embodiment, the first planetary gear assembly 31 includes a rear step (first step) and a front step (second step) having reduction ratios different from each other. The rear step (first step) in the first planetary gear assembly 31 includes the planetary gears 311P and the internal gear 311R. The front step (second step) in the first planetary gear assembly 31 includes the planetary gears 312P and the internal gear 312R. The front step has a greater reduction ratio than the rear step. When the pinion gear 31S rotates at a constant speed, the first carrier 31C rotates in the first reduction mode at a rotational speed lower than in the second reduction mode.

The annular member 35 includes a wire surrounding at least one of the internal gear 311R or the internal gear 312R. The annular member 35 includes an upper portion fixed to a lever 37. The lever 37 is connected to the speed switch lever 12. The lever 37 is guided by a guide rod 38 in the front-rear direction. The guide rod 38 is fixed to at least a part of the first casing 4A. The guide rod 38 in the embodiment has a rear end fixed to the bracket plate 4C. The guide rod 38 supports a coil spring 39. The coil spring 39 has a rear end supported by the bracket plate 4C. The coil spring 39 has a front end connected to the lever 37. The coil spring 39 urges the annular member 35 forward with the lever 37 in between.

The cam pins 250 are hooked on the annular member 35. Each cam pin 250 has a groove 250A receiving the annular member 35. The internal gear 311R and the internal gear 312R are accommodated in the first casing 4A. As shown in FIG. 11, the first casing 4A has guide grooves 4G on its inner surface to guide the cam pins 250. The cam pins 250 are received in the guide grooves 4G. The guide grooves 4G are elongated in the front-rear direction. The cam pins 250 are movable in the front-rear direction while being guided along the guide grooves 4G. The cam pins 250 are received in the guide grooves 4G and thus do not move in the circumferential direction.

The internal gear 311R includes multiple cam teeth 311F on its outer circumferential surface. The internal gear 312R includes multiple cam teeth 312F on its outer circumferential surface. The cam pins 250 are in contact with either the cam teeth 311F or the cam teeth 312F. The cam pins 250 move to a position facing the outer circumferential surface of the internal gear 311R and to a position facing the outer circumferential surface of the internal gear 312R while being guided by the guide grooves 4G. The cam teeth 311F in contact with the cam pins 250 restrict the rotation of the internal gear 311R. The cam teeth 312F in contact with the cam pins 250 restrict the rotation of the internal gear 312R.

The annular member 35 is connected to the speed switch lever 12. As the speed switch lever 12 moves in the front-rear direction, the annular member 35 moves in the front-rear direction. Thus, the cam pins 250 move in the front-rear direction together with the annular member 35.

When the annular member 35 moves forward to surround the internal gear 312R and the cam pins 250 face the outer circumferential surface of the internal gear 312R, the cam teeth 312F come in contact with the cam pins 250. This restricts the rotation of the internal gear 312R. More specifically, the annular member 35 moves forward to restrict the rotation of the internal gear 312R. This places the first planetary gear assembly 31 in the first reduction mode.

When the annular member 35 moves backward to surround the internal gear 311R and the cam pins 250 face the outer circumferential surface of the internal gear 311R, the cam teeth 311F come in contact with the cam pins 250. This restricts the rotation of the internal gear 311R. More specifically, the annular member 35 moves backward to restrict the rotation of the internal gear 311R. This places the first planetary gear assembly 31 in the second reduction mode.

The second speed switcher 72 switches between an enabled mode and a disabled mode. In the enabled mode, rotation reduction of the second planetary gear assembly 32 is enabled. In the disabled mode, the rotation reduction of the second planetary gear assembly 32 is disabled. The second planetary gear assembly 32 being placed in the enabled mode includes rotation of the internal gear 32R being restricted. The second planetary gear assembly 32 being placed in the disabled mode includes the rotation of the internal gear 32R being allowed. The rotation of the internal gear 32R is restricted to place the second planetary gear assembly 32 in the enabled mode. The rotation of the internal gear 32R is allowed to place the second planetary gear assembly 32 in the disabled mode.

The second speed switcher 72 includes a speed switching member 34 and a cam ring 36. The speed switching member 34 is connected to the speed switch lever 12 and the internal gear 32R. The cam ring 36 receives the internal gear 32R to restrict the rotation of the internal gear 32R.

The speed switching member 34 is movable in the front-rear direction inside the first casing 4A. The speed switching member 34 moves forward and enters the enabled mode. The speed switching member 34 moves backward and enters the disabled mode.

The speed switching member 34 includes a ring 34A, sliders 34B, and a lever 34C. The ring 34A surrounds the internal gear 32R. The ring 34A is connected to the internal gear 32R with pins 34D. The internal gear 32R has recesses 32D to receive the pins 34D on its outer circumferential surface. The pins 34D are received in the recesses 32D to connect the ring 34A and the internal gear 32R together.

The sliders 34B extend rearward from the ring 34A. Multiple sliders 34B are located circumferentially at intervals. The sliders 34B are guided by the guide grooves 4G on the inner surface of the first casing 4A in the front-rear direction.

The lever 34C is located above the ring 34A. The lever 34C is connected to the speed switch lever 12. The lever 34C includes a projection 34E protruding upward from its upper surface. A coil spring 34F is located in front of the projection 34E. A coil spring 34G is located behind the projection 34E. The coil spring 34F has a front end supported by at least a part of the first casing 4A. The coil spring 34F has a rear end connected to the projection 34E. The coil spring 34G has a rear end supported by at least a part of the speed switch lever 12. The coil spring 34G has a front end connected to the projection 34E. The coil spring 34F urges the speed switching member 34 backward. The coil spring 34G urges the speed switching member 34 forward.

The cam ring 36 is located in front of the internal gear 32R. The cam ring 36 is fixed to the first casing 4A. The cam ring 36 includes cam teeth on its inner circumferential surface. Multiple cam teeth are located circumferentially at intervals. The internal gear 32R includes cam teeth 32F on its outer circumferential surface. The cam teeth 32F mesh with the cam teeth on the cam ring 36.

As the speed switch lever 12 moves in the front-rear direction, the speed switching member 34 moves in the front-rear direction. Thus, the internal gear 32R connected to the ring 34A with the pins 34D moves in the front-rear direction. This switches the internal gear 32R between being received in and being removed from the cam ring 36.

The internal gear 32R moves forward to be at least partially received inside the cam ring 36, and the cam teeth on the cam ring 36 mesh with the cam teeth 32F on the internal gear 32R, restricting the rotation of the internal gear 32R. More specifically, the speed switching member 34 moves forward to restrict the rotation of the internal gear 32R. This places the second planetary gear assembly 32 in the enabled mode.

The internal gear 32R moves backward to be removed from inside the cam ring 36, and the cam teeth on the cam ring 36 separate from the cam teeth 32F on the internal gear 32R, allowing the rotation of the internal gear 32R. More specifically, the speed switching member 34 moves backward to allow the rotation of the internal gear 32R. This places the second planetary gear assembly 32 in the disabled mode.

When the second planetary gear assembly 32 is in the enabled mode, the internal gear 32R meshes with the planetary gears 32P alone. When the second planetary gear assembly 32 is in the disabled mode, the internal gear 32R meshes with both the planetary gears 32P and the first carrier 31C.

The speed mode of the reducer 30 in the embodiment includes the low-speed mode, the medium-speed mode, and the high-speed mode.

The movable range of the speed switch lever 12 is defined in the front-rear direction. The speed switch lever 12 moves to the first position P1 at the rear in the movable range to set the reducer 30 to the high-speed mode. The speed switch lever 12 moves to the second position P2 in the middle in the movable range to set the reducer 30 to the medium-speed mode. The speed switch lever 12 moves to the third position P3 at the front in the movable range to set the reducer 30 to the low-speed mode.

In the high-speed mode, the first planetary gear assembly 31 is set to the second reduction mode, and the second planetary gear assembly 32 is set to the disabled mode. The speed switch lever 12 moves to the first position P1 to set the first planetary gear assembly 31 to the second reduction mode, and set the second planetary gear assembly 32 to the disabled mode.

In the medium-speed mode, the first planetary gear assembly 31 is set to the first reduction mode, and the second planetary gear assembly 32 is set to the disabled mode. The speed switch lever 12 moves to the second position P2 to set the first planetary gear assembly 31 to the first reduction mode, and set the second planetary gear assembly 32 to the disabled mode.

In the low-speed mode, the first planetary gear assembly 31 is set to the first reduction mode, and the second planetary gear assembly 32 is set to the enabled mode. The speed switch lever 12 moves to the third position P3 to set the first planetary gear assembly 31 to the first reduction mode, and set the second planetary gear assembly 32 to the enabled mode.

FIGS. 6 to 13 each show the reducer 30 set to the low-speed mode.

Figure 14:
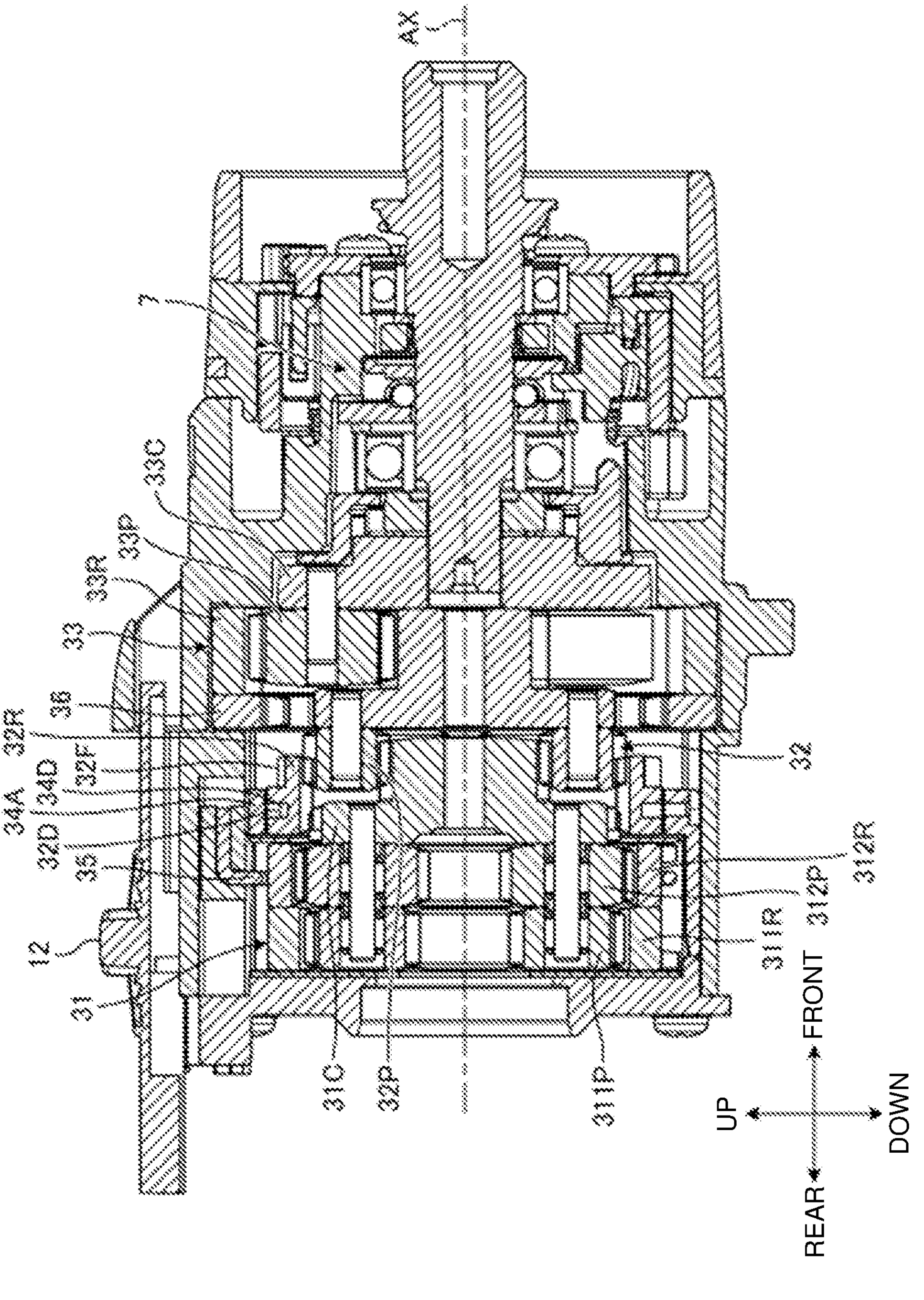
FIG. 14 is a sectional view of the power transmission in the first embodiment.
Figure 15:
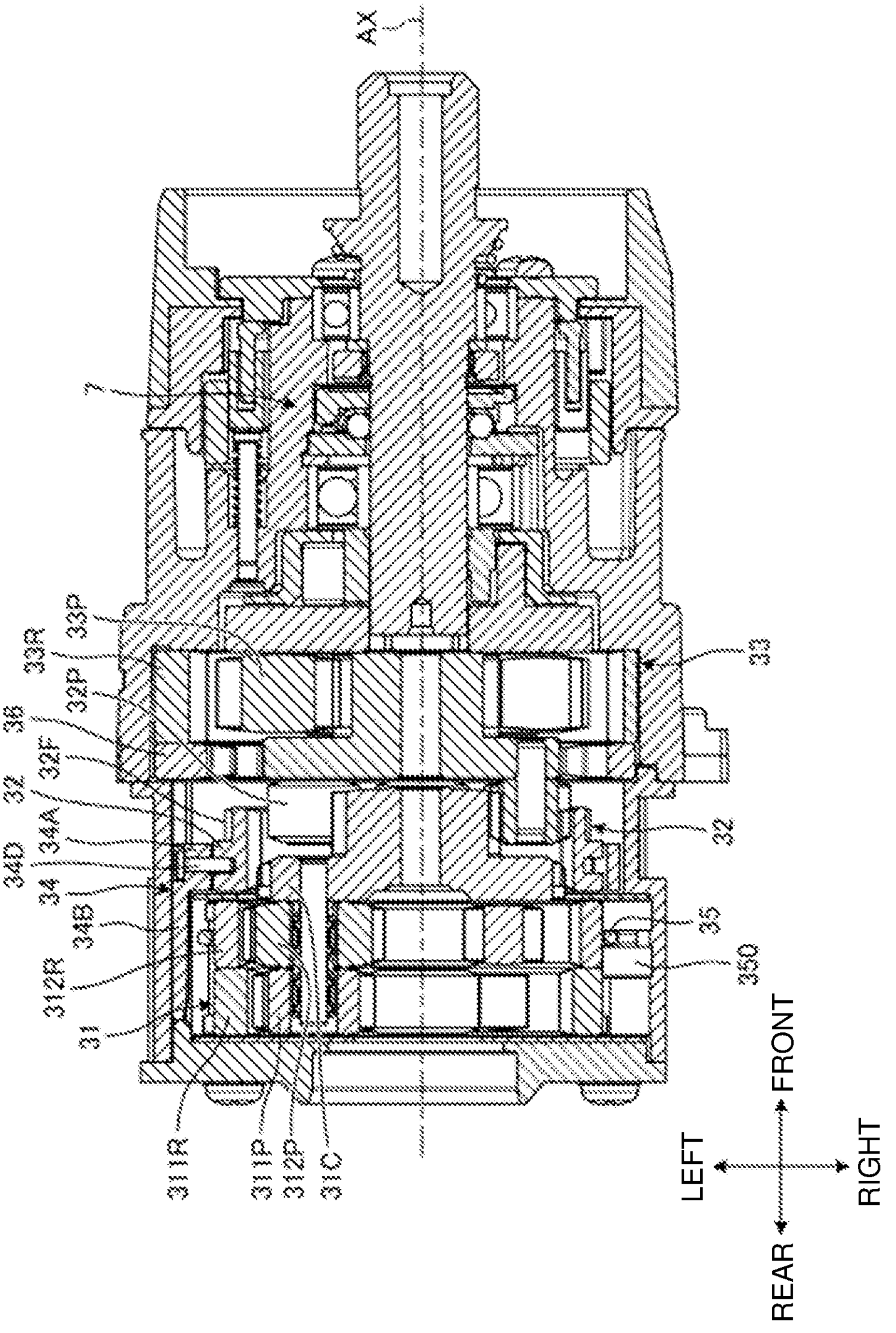
FIG. 15 is a sectional view of the power transmission in the first embodiment.
Figure 16:
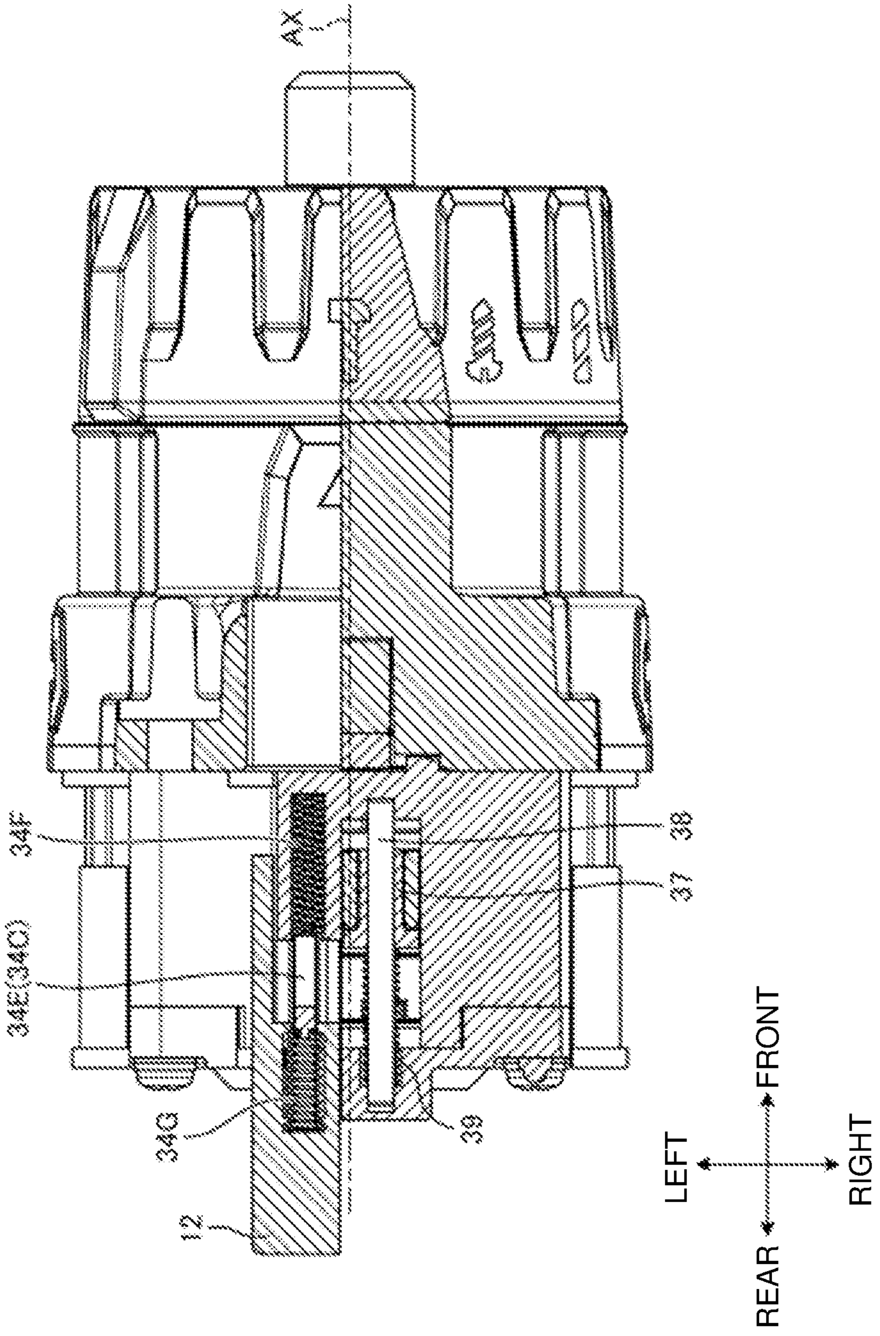
FIG. 16 is a sectional view of the power transmission in the first embodiment.

FIG. 14 is a sectional view of the power transmission 7 in the present embodiment, taken along line A-A as viewed in the direction indicated by arrows in FIG. 7. FIG. 15 is a sectional view of the power transmission 7, taken along line D-D as viewed in the direction indicated by arrows in FIG. 7. FIG. 16 is a sectional view of the power transmission 7, taken along line R-R as viewed in the direction indicated by arrows in FIG. 7. FIGS. 14 to 16 each show the reducer 30 set to the medium-speed mode.

The speed switch lever 12 is moved to the second position P2 to set the reducer 30 to the medium-speed mode. The lever 34C moves backward under an urging force from the coil spring 34F. The speed switching member 34 thus moves backward. The internal gear 32R connected to the ring 34A with the pins 34D thus moves backward. The internal gear 32R is removed from the cam ring 36 and meshes with both the planetary gears 32P and the first carrier 31C.

With the speed switch lever 12 at the second position P2, the annular member 35 surrounds the internal gear 312R. In the first planetary gear assembly 31, the internal gear 312R is restricted from rotating, and the internal gear 311R is rotatable.

Figure 17:
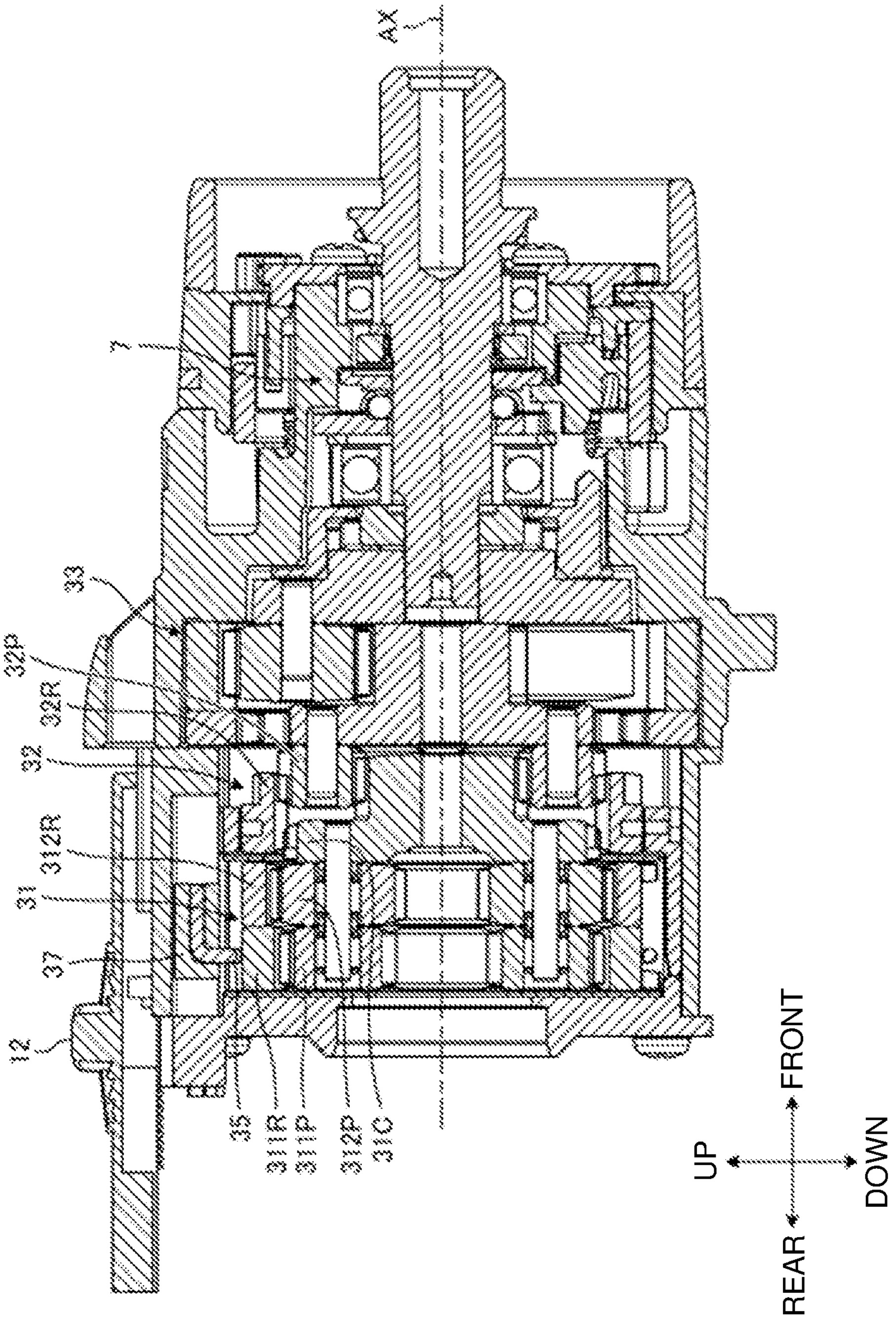
FIG. 17 is a sectional view of the power transmission in the first embodiment.
Figure 18:
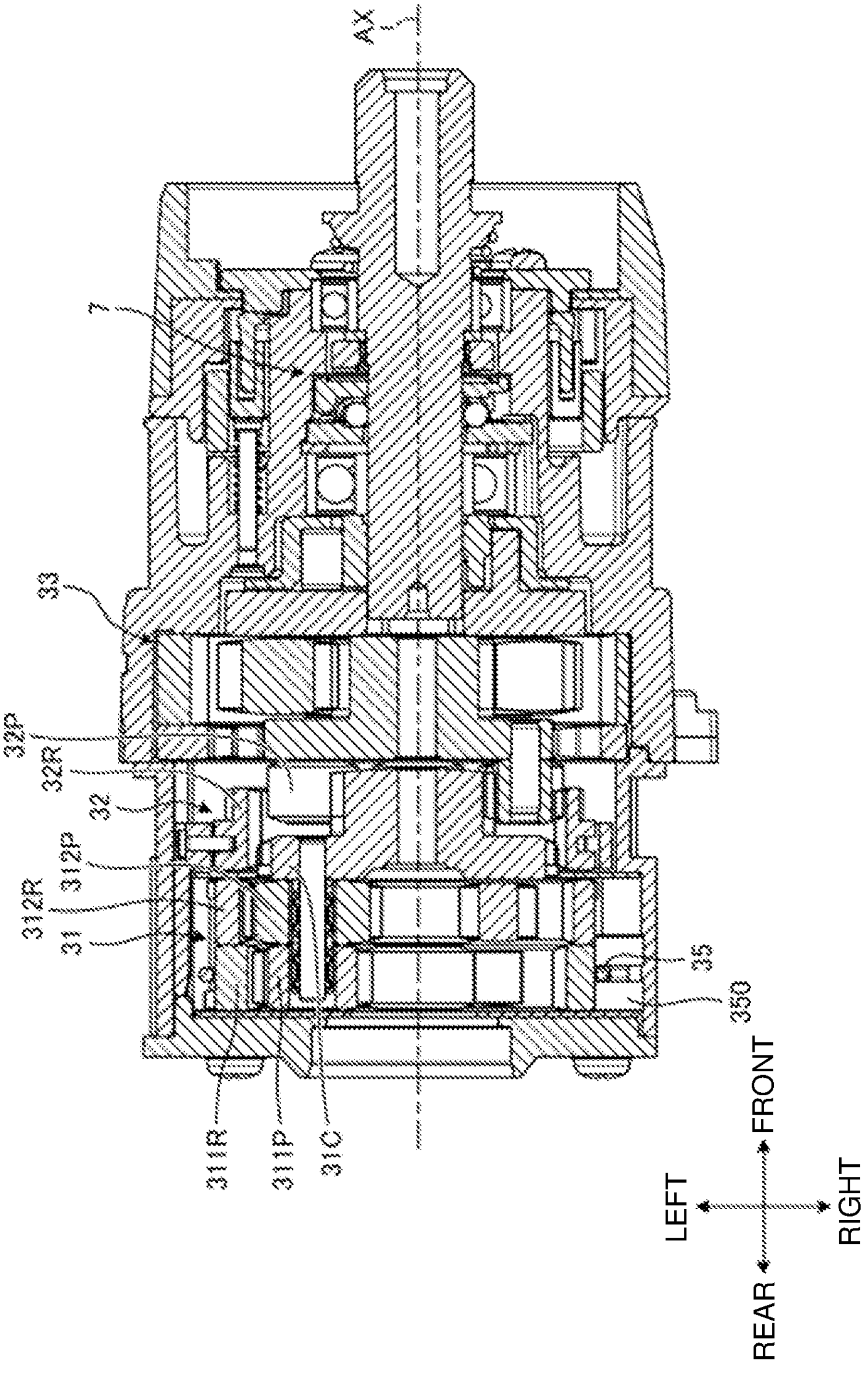
FIG. 18 is a sectional view of the power transmission in the first embodiment.
Figure 19:
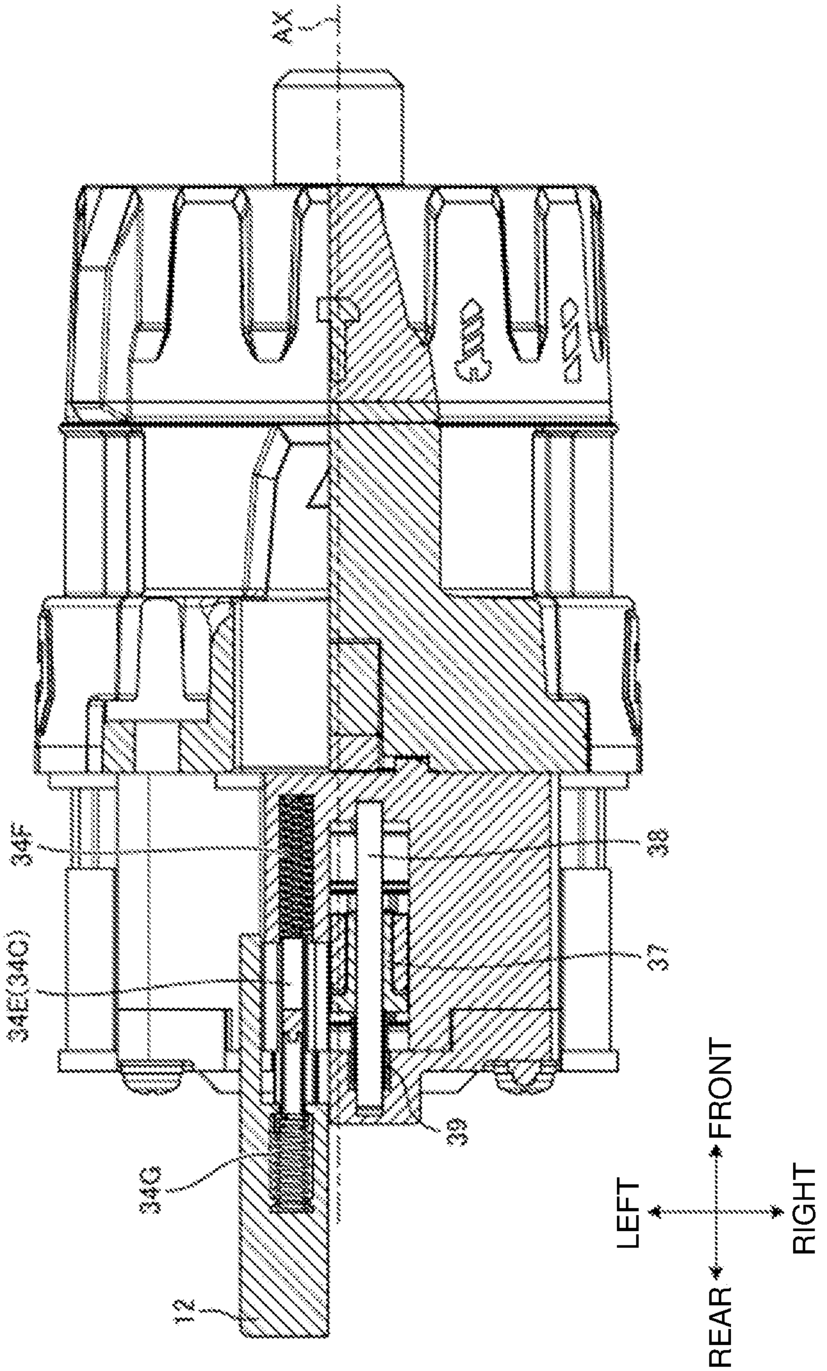
FIG. 19 is a sectional view of the power transmission in the first embodiment.

FIG. 17 is a sectional view of the power transmission 7 in the present embodiment, taken along line A-A as viewed in the direction indicated by arrows in FIG. 7. FIG. 18 is a sectional view of the power transmission 7, taken along line D-D as viewed in the direction indicated by arrows in FIG. 7. FIG. 19 is a sectional view of the power transmission 7, taken along line R-R as viewed in the direction indicated by arrows in FIG. 7. FIGS. 17 to 19 each show the reducer 30 set to the high-speed mode.

The speed switch lever 12 is moved to the first position P1 to set the reducer 30 to the high-speed mode. The lever 37 is then moved backward while being guided by the guide rod 38. The annular member 35 thus moves backward together with the cam pins 250. The annular member 35 surrounds the internal gear 311R. The cam pins 250 are in contact with the cam teeth 311F on the outer circumferential surface of the internal gear 311R. This restricts the rotation of the internal gear 311R. As the cam pins 250 move backward, the cam pins 250 and the cam teeth 312F on the outer circumferential surface of the internal gear 312R separate from each other. This allows rotation of the internal gear 312R.

With the speed switch lever 12 at the first position P1, the internal gear 32R in the second planetary gear assembly 32 is rotatable.

Operation of Reducer

When the motor 6 drives and rotates the rotor shaft 63 with the reducer 30 set to the low-speed mode, the pinion gear 31S rotates, and the planetary gears 312P revolve about the smaller-diameter portion 312S in the pinion gear 31S. The first carrier 31C and the sun gear 32S then rotate at a lower rotational speed than the rotor shaft 63. As the sun gear 32S rotates, the planetary gears 32P revolve about the sun gear 32S. The second carrier 32C and the sun gear 33S then rotate at a lower rotational speed than the first carrier 31C. When the motor 6 is driven with the internal gear 32R at a low-speed mode position, both the first planetary gear assembly 31 and the second planetary gear assembly 32 operate for rotation reduction, causing the second carrier 32C and the sun gear 33S to rotate in the low-speed mode.

When the motor 6 drives and rotates the rotor shaft 63 with the reducer 30 set to the medium-speed mode, the pinion gear 31S rotates, and the planetary gears 312P revolve about the smaller-diameter portion 312S in the pinion gear 31S. The first carrier 31C and the sun gear 32S then rotate at a lower rotational speed than the rotor shaft 63. The internal gear 32R meshes with both the planetary gears 32P and the first carrier 31C and thus rotates together with the first carrier 31C. As the internal gear 32R rotates, the planetary gears 32P revolve at a revolution speed that is the same as the rotational speed of the internal gear 32R. The second carrier 32C and the sun gear 33S then rotate at the same rotational speed as the first carrier 31C. When the motor 6 is driven with the second planetary gear assembly 32 set to the disabled mode, the first planetary gear assembly 31 operates for rotation reduction without the second planetary gear assembly 32 operating for rotation reduction, thus causing the second carrier 32C and the sun gear 33S to rotate in the medium-speed mode.

When the motor 6 drives and rotates the rotor shaft 63 with the reducer 30 set to the high-speed mode, the pinion gear 31S rotates, and the planetary gears 311P revolve about the larger-diameter portion 311S in the pinion gear 31S. The first carrier 31C and the sun gear 32S then rotate at a lower rotational speed than the rotor shaft 63. The internal gear 32R meshes with both the planetary gears 32P and the first carrier 31C and thus rotates together with the first carrier 31C. As the internal gear 32R rotates, the planetary gears 32P revolve at a revolution speed that is the same as the rotational speed of the internal gear 32R. The second carrier 32C and the sun gear 33S then rotate at the same rotational speed as the first carrier 31C. When the motor 6 is driven with the second planetary gear assembly 32 set to the disabled mode, the first planetary gear assembly 31 operates for rotation reduction without the second planetary gear assembly 32 operating for rotation reduction, thus causing the second carrier 32C and the sun gear 33S to rotate in the high-speed mode.

As the second carrier 32C and the sun gear 33S rotate, the planetary gears 33P revolve about the sun gear 33S. The third carrier 33C thus rotates, and the spindle 81 rotates.

Mode Sensor Board

Figure 20:
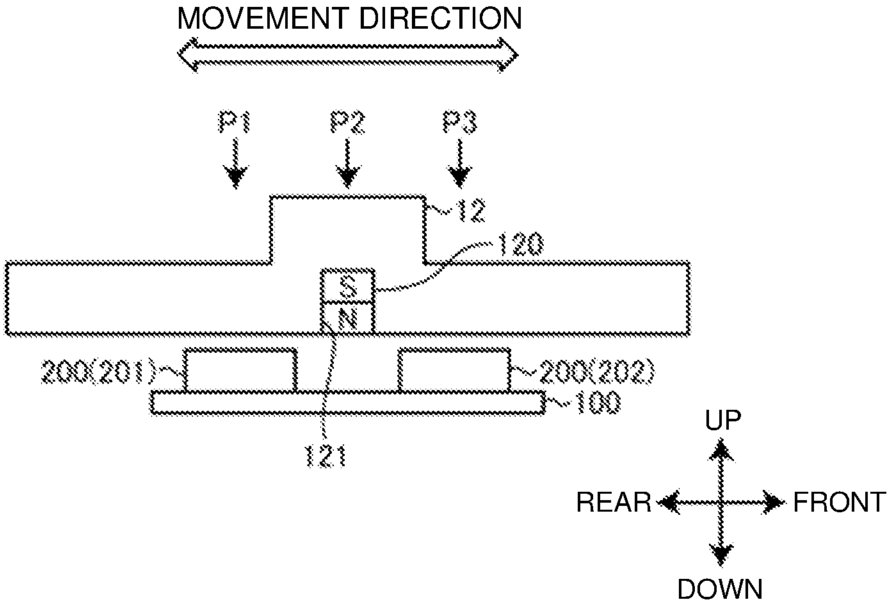
FIG. 20 is a schematic diagram of a mode sensor board in the first embodiment.

FIG. 20 is a schematic diagram of the mode sensor board 100 in the present embodiment. The mode sensor board 100 includes a circuit board on which multiple mode sensors 200 that detect the position of the speed switch lever 12 in the front-rear direction are mounted.

The speed switch lever 12 is moved in the front-rear direction to switch the speed mode of the reducer 30. The speed switch lever 12 in the present embodiment is moved in the front-rear direction to switch the speed mode of the reducer 30 between the high-speed mode, the medium-speed mode, and the low-speed mode. The speed switch lever 12 is located in the upper portion of the motor compartment 21. The speed switch lever 12 is at least partially located outside the motor compartment 21. The operator operates the speed switch lever 12 with a finger placed on the speed switch lever 12 to move the speed switch lever 12 in the front-rear direction. The speed switch lever 12 is movable in the front-rear direction relative to the motor compartment 21.

The speed switch lever 12 is moved to the first position P1, the second position P2, and the third position P3 relative to the motor compartment 21 in the movable range of the speed switch lever 12 defined in the front-rear direction. The first position P1 is defined rearward from the second position P2. The second position P2 is defined rearward from the third position P3. When the speed switch lever 12 is moved to the first position P1, the reducer 30 is set to the high-speed mode. When the speed switch lever 12 is moved to the second position P2, the reducer 30 is set to the medium-speed mode. When the speed switch lever 12 is moved to the third position P3, the reducer 30 is set to the low-speed mode.

The relative position of the mode sensor board 100 and the motor compartment 21 is fixed constantly. The mode sensor board 100 does not move relative to the motor compartment 21. The mode sensor board 100 may be fixed to the housing 2 or to the casing 4. The mode sensor board 100 is located below the speed switch lever 12. The speed switch lever 12 at least partially faces the mode sensor board 100.

Each mode sensor 200 detects the position of the speed switch lever 12 in the front-rear direction. The multiple mode sensors 200 are mounted on the upper surface of the mode sensor board 100. The mode sensors 200 are fixed to the mode sensor board 100. The multiple (two in the present embodiment) mode sensors 200 are spaced apart in the front-rear direction on the upper surface of the mode sensor board 100.

In the example described below, one mode sensor 200 may be referred to as a first mode sensor 201. The other mode sensor 200 may be referred to as a second mode sensor 202. The first mode sensor 201 is located rearward from the second mode sensor 202.

The speed switch lever 12 holds a permanent magnet 120. The permanent magnet 120 is fixed to the speed switch lever 12. The permanent magnet 120 is located at the middle of the speed switch lever 12 in the front-rear direction. A recess 121 is located on the lower surface of the speed switch lever 12. The permanent magnet 120 is received in the recess 121. The lower surface of the permanent magnet 120 and the upper surface of each mode sensor 200 can face each other.

Each mode sensor 200 includes a Hall sensor that detects the permanent magnet 120. The Hall sensor includes a Hall device that detects the magnetic field of the permanent magnet 120. Each mode sensor 200 detects the magnetic field of the permanent magnet 120 to detect the position of the speed switch lever 12.

Control System

Figure 21:
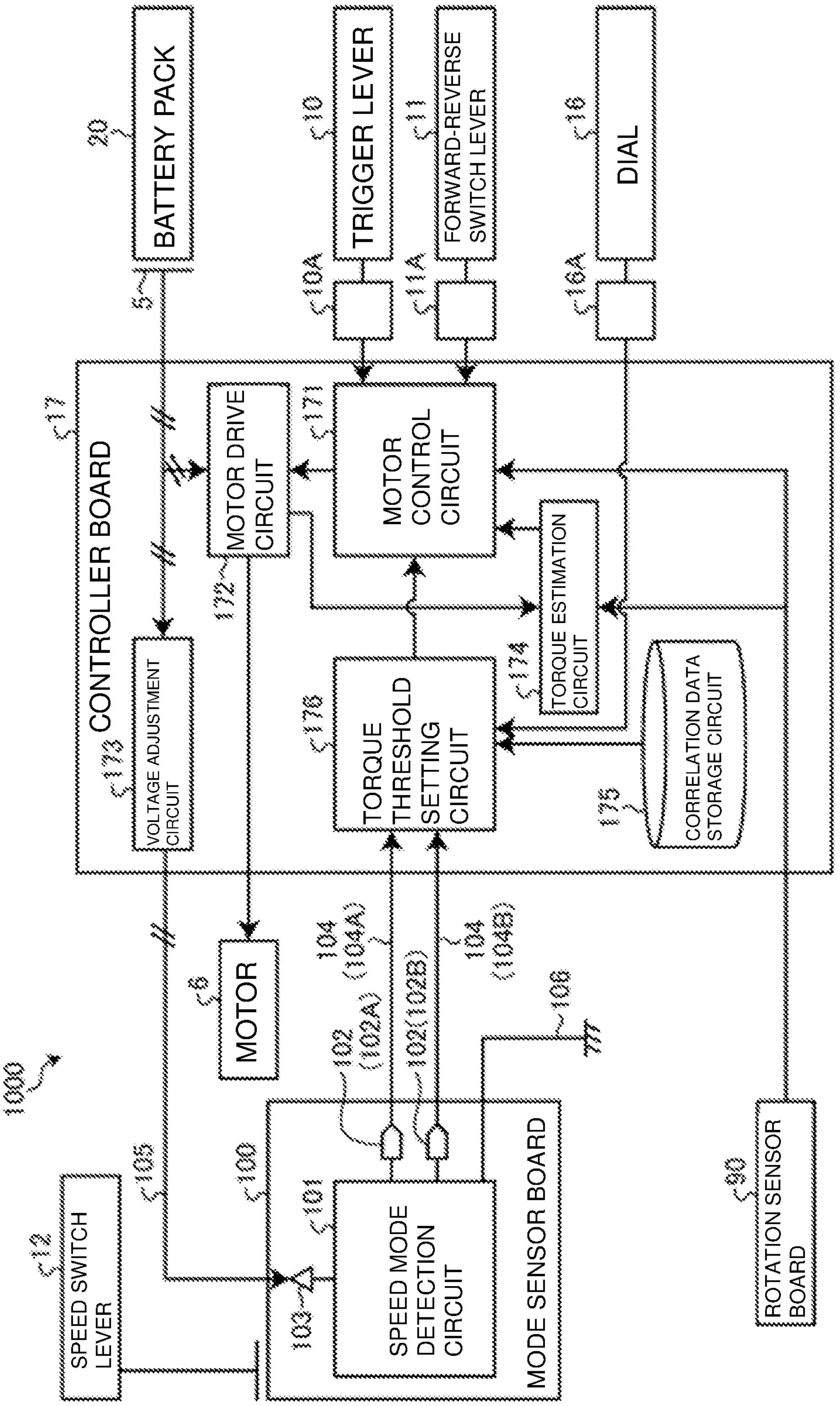
FIG. 21 is a block diagram of a control system of the driver drill according to the first embodiment.

FIG. 21 is a block diagram of a control system 1000 of the driver drill 1 according to the present embodiment. The control system 1000 includes the mode sensor board 100 and the controller board 17.

The mode sensor board 100 includes a speed mode detection circuit 101, output terminals 102, and an input terminal 103.

The speed mode detection circuit 101 includes the mode sensors 200. The speed mode detection circuit 101 determines the speed mode of the reducer 30 by detecting the position of the speed switch lever 12.

The multiple (two in the present embodiment) output terminals 102 are connected to the speed mode detection circuit 101. The output terminals 102 output an output signal from the speed mode detection circuit 101.

In the example described below, one output terminal 102 may be referred to as a first output terminal 102A. The other output terminal 102 may referred to as a second output terminal 102B.

The output terminals 102 are connected to the controller board 17 with output lead wires 104. The output lead wires 104 include a first output lead wire 104A and a second output lead wire 104B. The first output lead wire 104A is connected to the first output terminal 102A. The second output lead wire 104B is connected to the second output terminal 102B. The speed mode detection circuit 101 transmits output signals to the controller board 17 through the output terminals 102 and the output lead wires 104.

The input terminal 103 is connected to the speed mode detection circuit 101. A voltage is applied to the speed mode detection circuit 101 through the input terminal 103. The mode sensor board 100 in the present embodiment includes a single input terminal 103. The input terminal 103 is connected to the controller board 17 with an input lead wire 105. The controller board 17 applies a voltage to the speed mode detection circuit 101 through the input lead wire 105 and the input terminal 103. The speed mode detection circuit 101 is connected to a ground with a ground line 106. The ground is the reference for the potential of the speed mode detection circuit 101. The ground has a potential of, for example, 0 V.

The mode sensor board 100 is accommodated in the motor compartment 21. The controller board 17 is located in the battery holder 23. The output lead wires 104 are at least partially located in an internal space of the grip 22. The input lead wire 105 is at least partially located in the internal space of the grip 22.

The controller board 17 includes a motor control circuit 171, a motor drive circuit 172, a voltage adjustment circuit 173, a torque estimation circuit 174, a correlation data storage circuit 175, and a torque threshold setting circuit 176.

The motor control circuit 171 includes a microcomputer. The motor control circuit 171 is connected to each of a trigger signal generation circuit 10A and a forward-reverse switch signal generation circuit 11A.

In response to the trigger lever 10 being operated, the trigger signal generation circuit 10A generates a trigger signal. The trigger signal is input into the motor control circuit 171. The motor control circuit 171 outputs a control command to drive the motor 6 based on the trigger signal.

In response to the forward-reverse switch lever 11 being operated, the forward-reverse switch signal generation circuit 11A generates a forward-reverse switch signal. The forward-reverse switch signal is input into the motor control circuit 171. The motor control circuit 171 outputs a control command to change the rotation direction of the motor 6 based on the forward-reverse switch signal.

The motor drive circuit 172 supplies a drive current to the coils 61D in accordance with power supplied from the battery pack 20. The motor drive circuit 172 includes multiple switching devices. The multiple switching devices in the motor drive circuit 172 are activated based on the control command from the motor control circuit 171. The multiple coils 61D in the motor 6 are each assigned to one of the U-phase, the V-phase, or the W-phase. The motor drive circuit 172 supplies a U-phase drive current to a U-phase coil 61D, a V-phase drive current to a V-phase coil 61D, and a W-phase drive current to a W-phase coil 61D based on the control command from the motor control circuit 171.

The voltage adjustment circuit 173 applies a voltage to the speed mode detection circuit 101 in accordance with power supplied from the battery pack 20. The voltage adjustment circuit 173 is connected to the input terminal 103 with the input lead wire 105. The voltage adjustment circuit 173 adjusts the voltage applied to the speed mode detection circuit 101. The voltage adjustment circuit 173 includes a step-down circuit. The voltage adjustment circuit 173 applies a voltage lower than the rated voltage of the battery pack 20 to the speed mode detection circuit 101.

The torque estimation circuit 174 estimates torque applied to the motor 6. The torque estimation circuit 174 in the present embodiment estimates the torque applied to the motor 6 based on a drive current supplied to the coils 61D and a rotational speed of the rotor 62 detected by the rotation sensors on the rotation sensor board 90.

The torque threshold setting circuit 176 is connected to a threshold signal generation circuit 16A. In response to the dial 16 being operated, the threshold signal generation circuit 16A generates a threshold signal indicating an input value of the torque threshold. The threshold signal is input into the torque threshold setting circuit 176.

The correlation data storage circuit 175 stores correlation data indicating the relationship between the input value of the torque threshold defined by the threshold signal generated by the threshold signal generation circuit 16A, the set value of the torque threshold, and the speed mode of the reducer 30.

Figure 22:
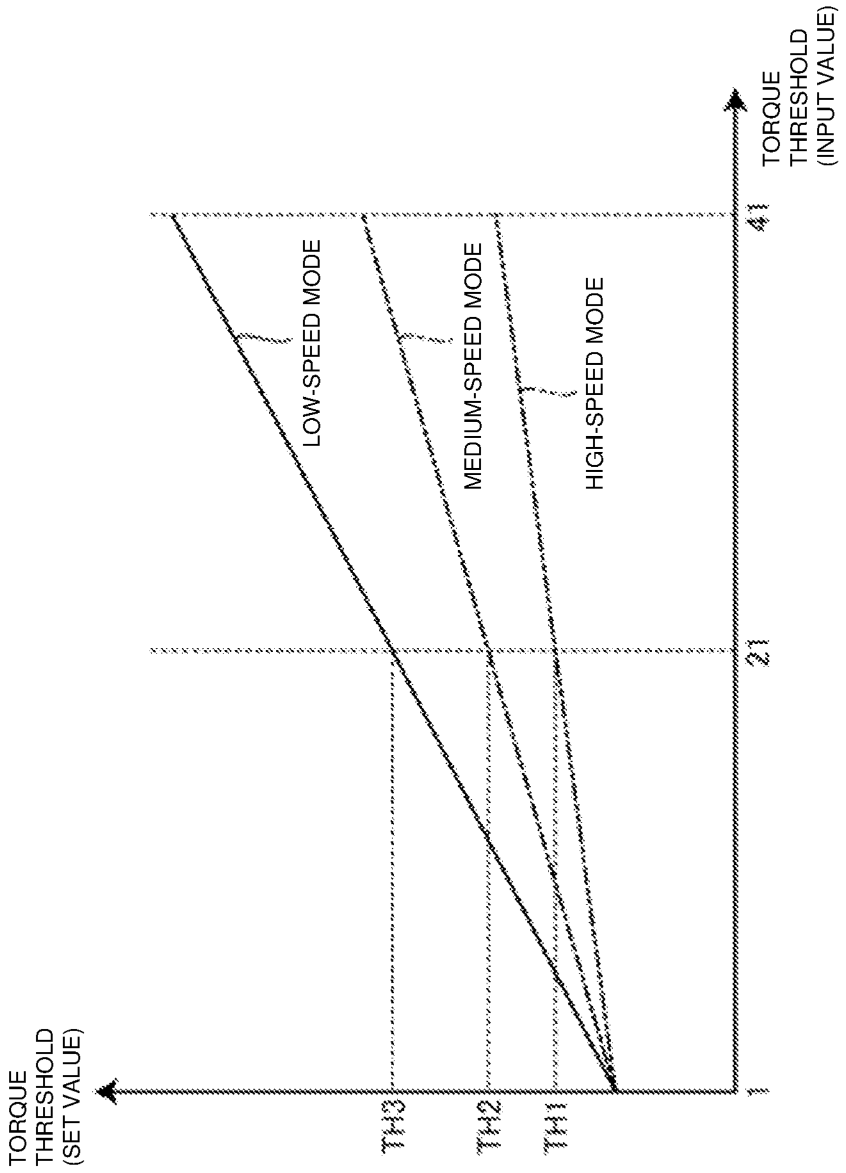
FIG. 22 is a diagram of example correlation data stored in a correlation data storage circuit in the first embodiment.

FIG. 22 shows example correlation data stored in the correlation data storage circuit 175 in the present embodiment. In the present embodiment, the operator can input a torque threshold selected from 41 different values by operating the dial 16. The threshold signal generation circuit 16A generates, in response to the operation amount of the dial 16, a threshold signal indicating an input value for the torque threshold selected from the different 41 values. The number of torque thresholds to be input is not limited to 41 and may be less than or more than 41.

As shown in FIG. 22, the torque thresholds are set to different values for the input value of the torque threshold in the high-, medium-, and low-speed modes. For example, for the input value of the torque threshold being 21, the torque threshold in the high-speed mode is set to a value TH1, the torque threshold in the medium-speed mode is set to a value TH2 greater than the value TH1, and the torque threshold in the low-speed mode is set to a value TH3 greater than the value TH2.

The correlation data shown in FIG. 22 is an example. For example, the torque threshold being a smaller input value may be set at the same value for the high-, medium-, and low-speed modes.

The torque threshold setting circuit 176 sets the torque threshold based on the threshold signal input from the threshold signal generation circuit 16A, the correlation data stored in the correlation data storage circuit 175, and the speed mode of the reducer 30 determined by the speed mode detection circuit 101. The torque threshold setting circuit 176 is connected to the speed mode detection circuit 101 with the output lead wires 104 and the output terminals 102. The torque threshold setting circuit 176 receives an output signal from the speed mode detection circuit 101 that indicates the speed mode of the reducer 30 through the output terminals 102 and the output lead wires 104. The torque threshold setting circuit 176 determines the speed mode of the reducer 30 based on an output signal from the speed mode detection circuit 101 output from the output terminals 102. The torque threshold setting circuit 176 determines whether the reducer 30 is set to the high-, medium-, or low-speed mode based on an output signal from the speed mode detection circuit 101 output from the output terminals 102.

The motor control circuit 171 outputs a control command to control the motor 6 based on the torque applied to the motor 6 estimated by the torque estimation circuit 174 and the torque threshold set by the torque threshold setting circuit 176. The motor control circuit 171 outputs a control command to stop the motor 6 in response to the torque estimated by the torque estimation circuit 174 being applied to the motor 6 exceeding the torque threshold set by the torque threshold setting circuit 176 while the motor 6 is being driven in the clutch mode.

Speed Mode Detection Circuit

Figure 23:
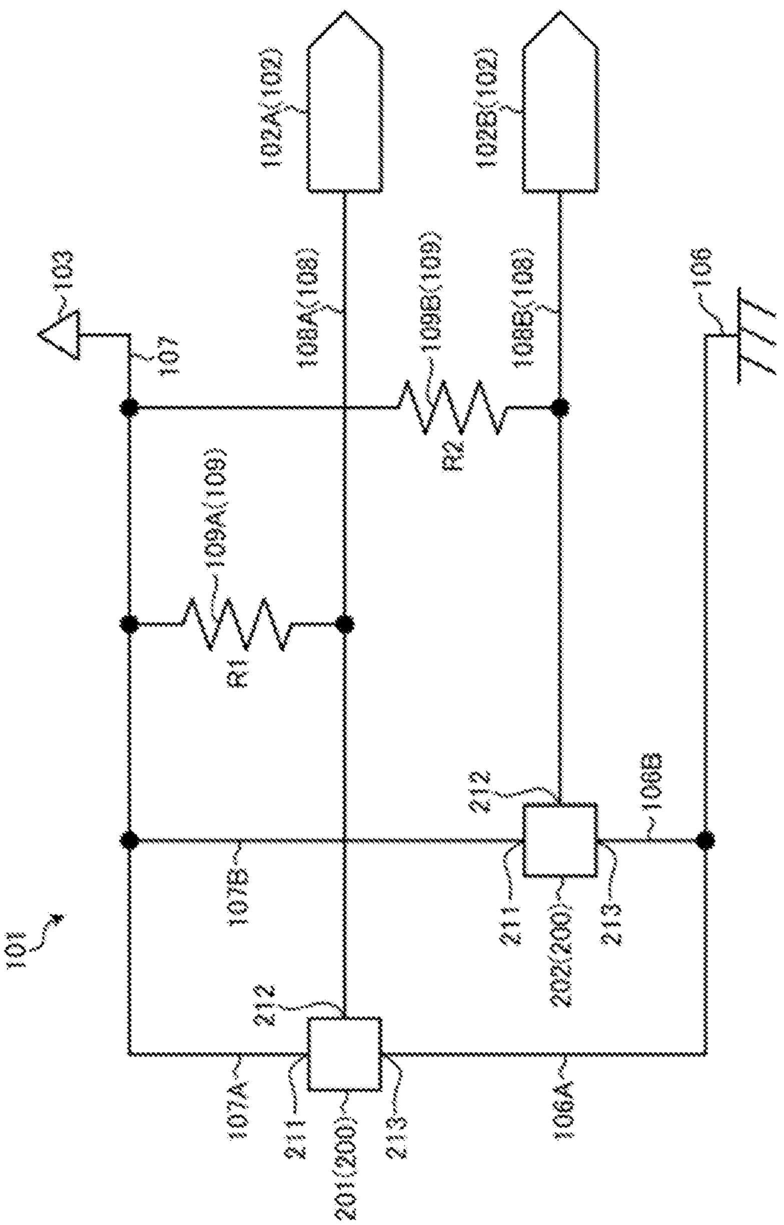
FIG. 23 is a diagram of a speed mode detection circuit in the first embodiment.

FIG. 23 is a diagram of the speed mode detection circuit 101 in the present embodiment. As shown in FIG. 23, the multiple mode sensors 200 (201 and 202) are connected in parallel with each other to the input terminal 103. The multiple mode sensors 200 (201 and 202) are connected in parallel with each other to the ground. Each of the mode sensors 200 (201 and 202) includes a power port 211, a ground port 212, and a ground port 213. Each power port 211 receives a current from the input terminal 103. Each ground port 212 is connected to the input terminal 103 with a resistor 109 in between. Each ground port 213 is connected to the ground with the ground line 106.

Each of the mode sensors 200 (201 and 202) is connected to the input terminal 103 with a power line 107. The power port 211 in the first mode sensor 201 is connected to the input terminal 103 with a first power line 107A and the power line 107. The power port 211 in the second mode sensor 202 is connected to the input terminal 103 with a second power line 107B and the power line 107. The first power line 107A and the second power line 107B are connected in parallel with each other to the input terminal 103. The power line 107 connects the input terminal 103 to the first power line 107A and the second power line 107B. A voltage is applied to the first mode sensor 201 through the input terminal 103, the power line 107, and the first power line 107A. A voltage is applied to the second mode sensor 202 through the input terminal 103, the power line 107, and the second power line 107B.

Each of the mode sensors 200 (201 and 202) is connected to the corresponding output terminal 102 with signal lines 108. Each output terminal 102 is connected to one of the mode sensors 200 (201 and 202). The output terminals 102 in the present embodiment include the first output terminal 102A and the second output terminal 102B. The first output terminal 102A is connected to the first mode sensor 201. The second output terminal 102B is output to the second mode sensor 202. The signal lines 108 include a first signal line 108A and a second signal line 108B. The first signal line 108A connects the first mode sensor 201 and the first output terminal 102A. The second signal line 108B connects the second mode sensor 202 and the second output terminal 102B. The ground port 212 in the first mode sensor 201 is connected to the first output terminal 102A with the first signal line 108A. The ground port 212 in the second mode sensor 202 is connected to the second output terminal 102B with the second signal line 108B.

Each of the mode sensors 200 (201 and 202) is connected to the input terminal 103 with the corresponding resistor 109 in between. The resistors 109 include a first resistor 109A and a second resistor 109B. The first resistor 109A is connected to the first mode sensor 201. The second resistor 109B is connected to the second mode sensor 202. The first resistor 109A and the second resistor 109B are connected in parallel with each other to the input terminal 103. The first resistor 109A connects the power line 107 and the first signal line 108A. The second resistor 109B connects the power line 107 and the second signal line 108B. The ground port 212 in the first mode sensor 201 is connected to the input terminal 103 with the first signal line 108A, the first resistor 109A, and the power line 107. The ground port 212 in the second mode sensor 202 is connected to the input terminal 103 with the second signal line 108B, the second resistor 109B, and the power line 107.

Each of the mode sensors 200 (201 and 202) is connected to the ground with the ground line 106. The ground port 213 in the first mode sensor 201 is connected to the ground with a first ground line 106A and the ground line 106. The ground port 213 in the second mode sensor 202 is connected to the ground with a second ground line 106B and the ground line 106. The first ground line 106A and the second ground line 106B are connected in parallel with each other to the ground. The ground line 106 connects the ground to the first ground line 106A and the second ground line 106B.

Figure 24:
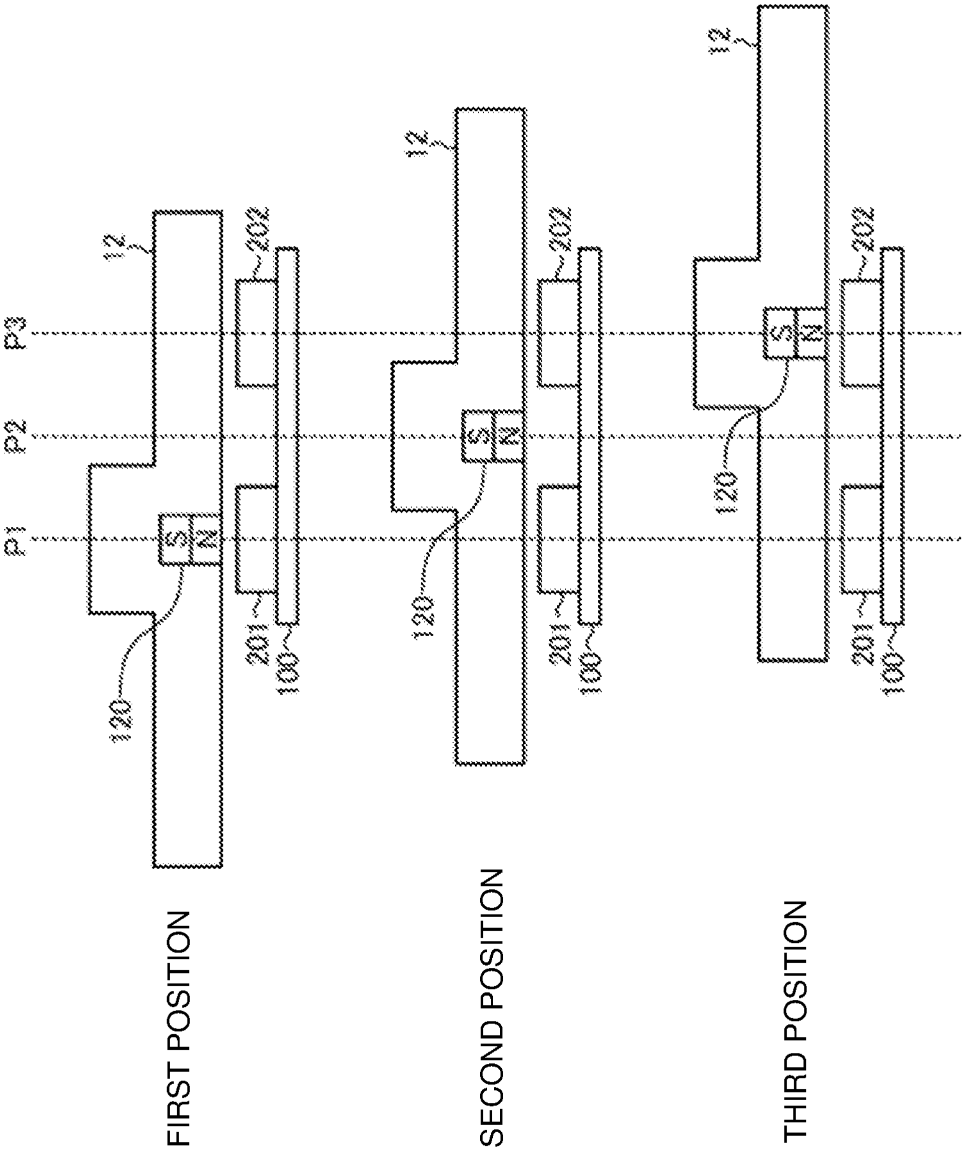
FIG. 24 is a diagram illustrating the position of a speed switch lever with respect to the mode sensor board in the first embodiment.

FIG. 24 is a diagram illustrating the position of the speed switch lever 12 with respect to the mode sensor board 100 in the present embodiment. FIG. 25 is a diagram describing the relationship between the position of the speed switch lever 12, the states of the mode sensors 200, and output signals from the output terminals 102.

As shown in FIG. 24, the speed switch lever 12 is moved to the first position P1, the second position P2, and the third position P3. The first position P1 is defined rearward from the second position P2. The second position P2 is defined rearward from the third position P3. The first mode sensor 201 is located rearward from the second mode sensor 202.

With the speed switch lever 12 at the first position P1, the permanent magnet 120 faces the first mode sensor 201 and does not face the second mode sensor 202. With the speed switch lever 12 at the second position P2, the permanent magnet 120 faces neither the first mode sensor 201 or the second mode sensor 202. In this state, the permanent magnet 120 faces a space between the first mode sensor 201 and the second mode sensor 202. With the speed switch lever 12 at the third position P3, the permanent magnet 120 faces the second mode sensor 202 and does not face the first mode sensor 201.

Each mode sensor 200 detects the permanent magnet 120 when the permanent magnet 120 and the mode sensor 200 face each other. The first mode sensor 201 is located on the mode sensor board 100 to detect the permanent magnet 120 with the speed switch lever 12 at the first position P1 and not to detect the permanent magnet 120 with the speed switch lever 12 at the second position P2 or at the third position P3. The second mode sensor 202 is located on the mode sensor board 100 to detect the permanent magnet 120 with the speed switch lever 12 at the third position P3 and not to detect the permanent magnet 120 with the speed switch lever 12 at the first position P1 or at the second position P2.

In response to detecting the permanent magnet 120, the mode sensor 200 is turned on to connect the ground port 212 and the ground port 213. In response to detecting no permanent magnet 120, the mode sensor 200 is turned off not to connect the ground port 212 and the ground port 213.

As shown in FIG. 25, with the speed switch lever 12 at the first position P1, the first mode sensor 201 detects the permanent magnet 120 and is turned on. With the speed switch lever 12 at least at the second position P2 or at the third position P3, the first mode sensor 201 does not detect the permanent magnet 120 and is turned off.

As shown in FIG. 25, with the speed switch lever 12 at the third position P3, the second mode sensor 202 detects the permanent magnet 120 and is turned on. With the speed switch lever 12 at least at the first position P1 or at the second position P2, the second mode sensor 202 does not detect the permanent magnet 120 and is turned off.

With the first mode sensor 201 being on, the first output terminal 102A has a potential substantially equal to the potential of the ground. A current supplied from the input terminal 103 to the first resistor 109A flows through the first mode sensor 201, the first ground line 106A, and the ground line 106 to the ground and does not flow to the first output terminal 102A. Thus, an output signal at a L level (first level) is output from the first output terminal 102A.

With the first mode sensor 201 being off, the first output terminal 102A has a higher potential than the ground. A current supplied from the input terminal 103 to the first resistor 109A flows to the first output terminal 102A through the first signal line 108A and does not flow to the ground. Thus, an output signal at a H level (second level) is output from the first output terminal 102A.

With the second mode sensor 202 being on, the second output terminal 102B has a potential substantially equal to the potential of the ground. A current supplied from the input terminal 103 to the second resistor 109B flows through the second mode sensor 202, the second ground line 106B, and the ground line 106 to the ground and does not flow to the second output terminal 102B. Thus, an output signal at the L level (first level) is output from the second output terminal 102B.

With the second mode sensor 202 being off, the second output terminal 102B has a higher potential than the ground. A current supplied from the input terminal 103 to the second resistor 109B flows through the second signal line 108B to the second output terminal 102B and does not flow to the ground. Thus, an output signal at the H level (second level) is output from the second output terminal 102B.

With the speed switch lever 12 at the first position P1 to switch the speed mode of the reducer 30 to the high-speed mode, the first mode sensor 201 is turned on and the second mode sensor 202 is turned off. Thus, an output signal at the L level is output from the first output terminal 102A, and an output signal at the H level is output from the second output terminal 102B.

With the speed switch lever 12 at the second position P2 to switch the speed mode of the reducer 30 to the medium-speed mode, the first mode sensor 201 is turned off, and the second mode sensor 202 is turned off. Thus, an output signal at the H level is output from the first output terminal 102A, and an output signal at the H level is output from the second output terminal 102B.

With the speed switch lever 12 at the third position P3 to switch the speed mode of the reducer 30 to the low-speed mode, the first mode sensor 201 is turned off, and the second mode sensor 202 is turned on. Thus, an output signal at the H level is output from the first output terminal 102A, and an output signal at the L level is output from the second output terminal 102B.

Thus, the combination of the level of the output signal output from the first output terminal 102A and the level of the output signal output from the second output terminal 102B varies depending on the position of the speed switch lever 12. This allows the torque threshold setting circuit 176 in the controller board 17 to determine the speed mode of the reducer 30 that changes depending on the position of the speed switch lever 12, based on output signals from the first output terminal 102A and the second output terminal 102B.

The level of the output signal refers to the intensity (potential) of the output signal. The value of the L level is, for example, 0. For the input terminal 103 with a potential of Vs, the value at the H level is, for example, Vs.

As described above, the driver drill 1 according to the present embodiment includes the reducer 30 that operates in an operation mode of the multiple speed modes, the speed switch lever 12 that is moved to switch the speed mode, the multiple mode sensors 200 located in the direction of movement of the speed switch lever 12 to detect the speed switch lever 12, the mode sensor board 100 on which the mode sensors 200 are mounted, including the output terminals 102 connected to the mode sensors 200, and the controller board 17 connected to the output terminals 102 with the output lead wires 104 to determine the speed mode based on the output signal output from the output terminals 102. The multiple speed modes are three speed modes. The mode sensors 200 are equal in number to or fewer than the speed modes. The mode sensors 200 in the present embodiment are fewer than the speed modes.

This structure avoids use of more output lead wires 104. The output terminals 102 in the mode sensor board 100 are connected to the controller board 17 with the output lead wires 104. The controller board 17 determines the speed mode of the reducer 30 based on the output signals output from the output terminals 102. The three speed modes are the high-speed mode, the medium-speed mode, and the low-speed mode. When the number of mode sensors 200 is equal to or less than three, the number of output terminals 102 may be equal to or less than three. This structure can avoid use of more output terminals 102 to avoid use of more output lead wires 104 connecting the output terminals 102 and the controller board 17.

The mode sensors 200 in the present embodiment are two mode sensors that are fewer than the speed modes by one.

For the two mode sensors 200, the two output lead wires 104, or specifically, the first output lead wire 104A and the second output lead wire 104B, are used.

Each output terminal 102 in the present embodiment is connected to the corresponding one of the multiple mode sensors 200.

In this structure, an output signal from each mode sensor 200 is transmitted to the controller board 17 through the corresponding output terminal 102 and the corresponding output lead wire 104.

The mode sensor board 100 in the present embodiment includes the input terminal 103 connected to the mode sensors 200. The mode sensors 200 receive a voltage applied through the input terminal 103.

The mode sensors 200 can be driven or output an output signal in response to the voltage applied through the input terminal 103.

The multiple mode sensors 200 in the present embodiment are connected in parallel with one another. Each of the multiple mode sensors 200 is connected to the input terminal 103 with the power line 107.

This structure avoids use of more input terminals 103.

The mode sensor board 100 in the present embodiment includes the input terminal 103 being a single input terminal 103.

This structure avoids use of more input terminals 103. In addition, this structure may include a single input lead wire 105.

The speed switch lever 12 in the present embodiment holds the permanent magnet 120. Each mode sensor 200 includes a Hall sensor that detects the permanent magnet 120. Each mode sensor 200 includes the power port 211 to which a current is supplied, the ground port 212 connected to the input terminal 103 with the resistor 109 in between, and the ground port 213 connected to the ground.

This allows the mode sensors 200 to detect the position of the speed switch lever 12 by detecting the magnetic field of the permanent magnet 120 held by the speed switch lever 12.

The mode sensors 200 in the present embodiment include the first mode sensor 201 and the second mode sensor 202. The output terminals 102 include the first output terminal 102A connected to the first mode sensor 201 and the second output terminal 102B connected to the second mode sensor 202. The resistor 109 includes the first resistor 109A connected to the first mode sensor 201 and the second resistor 109B connected to the second mode sensor 202. With the speed switch lever 12 at the first position P1 to switch the operation mode to the high-speed mode, the first output terminal 102A outputs an output signal at the L level, and the second output terminal 102B outputs an output signal at the H level. With the speed switch lever 12 at the second position P2 to switch the operation mode to the medium-speed mode, the first output terminal 102A outputs an output signal at the H level, and the second output terminal 102B outputs an output signal at the H level. With the speed switch lever 12 at the third position P3 to switch the operation mode to the low-speed mode, the first output terminal 102A outputs an output signal at the H level, and the second output terminal 102B outputs an output signal at the L level.

In this structure, the combination of the level of the output signal output from the first output terminal 102A and the level of the output signal output from the second output terminal 102B varies depending on the position of the speed switch lever 12. Thus, the controller board 17 can determine the speed mode of the reducer 30 that changes depending on the position of the speed switch lever 12.

The mode sensors 200 in the present embodiment are turned on to connect the ground port 212 and the ground port 213 in response to detecting the permanent magnet 120. The mode sensors 200 are turned off not to connect the ground port 212 and the ground port 213 in response to detecting no permanent magnet 120.

This allows the mode sensors 200 to detect the position of the permanent magnet 120.

The first position P1 is defined rearward from the second position P2. The second position P2 is defined rearward from the third position P3. The first mode sensor 201 is located on the mode sensor board 100 to detect the permanent magnet 120 with the speed switch lever 12 at the first position P1 and not to detect the permanent magnet 120 with the speed switch lever 12 at the second position P2 or at the third position P3. The second mode sensor 202 is located on the mode sensor board 100 to detect the permanent magnet 120 with the speed switch lever 12 at the third position P3 and not to detect the permanent magnet 120 with the speed switch lever 12 at the first position P1 or the second position P2.

This changes the level of the output signal output from the output terminal 102 depending on the position of the permanent magnet 120.

The driver drill 1 according to the present embodiment includes the motor 6 and the first planetary gear assembly 31. The first planetary gear assembly 31 includes the rear stage including the multiple planetary gears 311P surrounding the pinion gear 31S rotated by the motor 6 and the internal gear 311R surrounding the multiple planetary gears 311P, and the front stage including the multiple planetary gears 312P having the reduction ratio different from the reduction ratio of the rear stage and surrounding the pinion gear 31S and the internal gear 312R surrounding the multiple planetary gears 312P. The driver drill 1 includes the second planetary gear assembly 32 located frontward from the first planetary gear assembly 31 to be actuated by the rotational force from the first planetary gear assembly 31, the spindle 81 rotated by the rotational force from the motor 6 transmitted through the second planetary gear assembly 32, and the housing 2 including the motor compartment 21 accommodating the motor 6.

The driver drill 1 includes the first speed switcher 71 switching between the first reduction mode in which rotation of the internal gear 312R is prevented and rotation of the internal gear 311R is permitted, and the second reduction mode in which rotation of the internal gear 311R is prevented and rotation of the internal gear 312R is permitted, and the second speed switcher 72 switching between the enabled mode in which rotation of the internal gear 32R in the second planetary gear assembly 32 is prevented, and the disabled mode in which rotation of the internal gear 32R is permitted. The driver drill 1 includes the speed switch lever 12 moved to the first position P1, the second position P2, and the third position P3 relative to the motor compartment 21, and the two mode sensors 200 that detect the position of the speed switch lever 12. With the speed switch lever 12 at the first position P1, the first planetary gear assembly 31 is set to the second reduction mode, and the second planetary gear assembly 32 is set to the disabled mode. With the speed switch lever 12 at the second position P2, the first planetary gear assembly 31 is set to the first reduction mode, and the second planetary gear assembly 32 is set to the disabled mode. With the speed switch lever 12 at the third position P3, the first planetary gear assembly 31 is set to the first reduction mode, and the second planetary gear assembly 32 is set to the enabled mode.

In this structure, with the speed switch lever 12 at the first position P1, the reducer 30 including the first planetary gear assembly 31 and the second planetary gear assembly 32 is set to the high-speed mode. With the speed switch lever 12 at the second position P2, the reducer 30 including the first planetary gear assembly 31 and the second planetary gear assembly 32 is set to the medium-speed mode. With the speed switch lever 12 at the third position P3, the reducer 30 including the first planetary gear assembly 31 and the second planetary gear assembly 32 is set to the low-speed mode. The two mode sensors 200 are used to determine one of the three speed modes in which the reducer 30 is set, of the high-speed mode, the medium-speed mode, and the low-speed mode. This structure avoids use of more output lead wires 104 connected to the mode sensors 200.

Second Embodiment

A second embodiment will now be described. The same or corresponding components as those in the above embodiment are given the same reference numerals herein and will be described briefly or will not be described.

Speed Mode Detection Circuit

Figure 26:
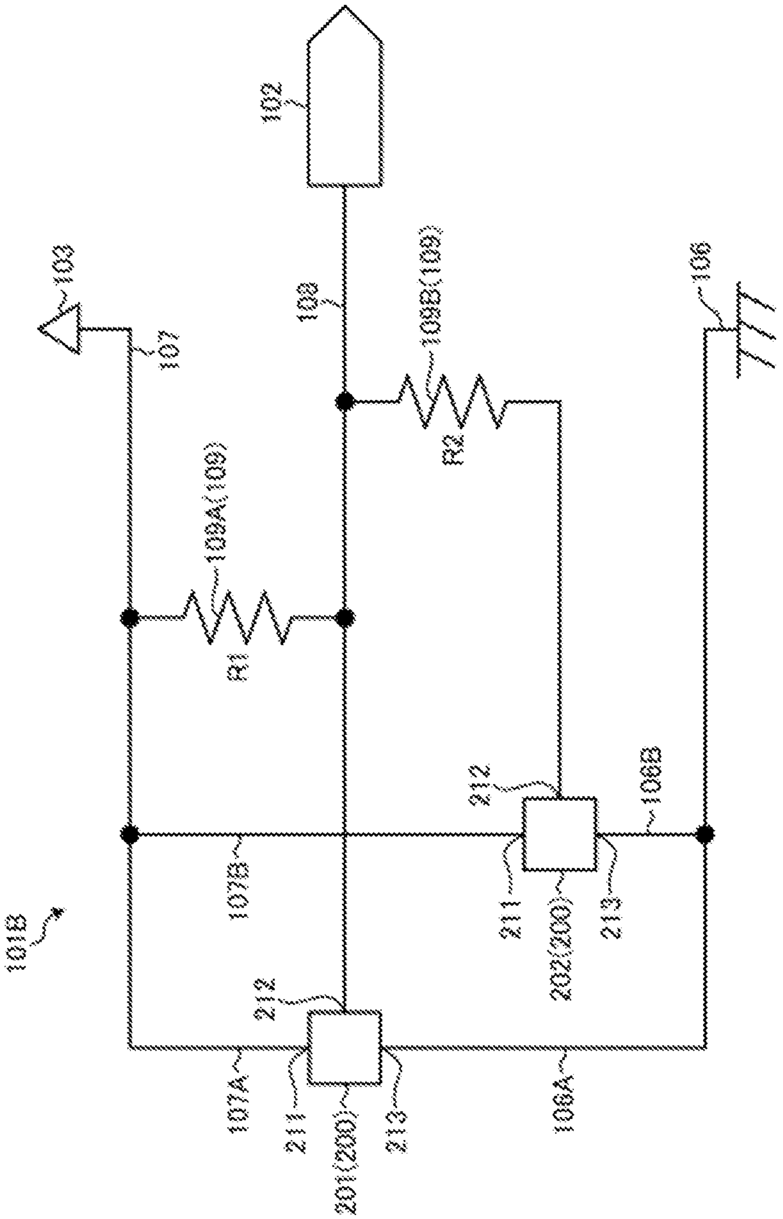
FIG. 26 is a diagram of a speed mode detection circuit in a second embodiment.

FIG. 26 is a diagram of a speed mode detection circuit 101B in the present embodiment. FIG. 27 is a diagram describing the relationship between the position of the speed switch lever 12, the states of mode sensors 200, and output signals from an output terminal 102.

As in the embodiment described above, multiple mode sensors 200 (201 and 202) are connected in parallel with each other to an input terminal 103. The multiple mode sensors 200 (201 and 202) are connected in parallel with each other to a ground. Each of the mode sensors 200 (201 and 202) includes a power port 211, a ground port 212, and a ground port 213. Each power port 211 receives a current from the input terminal 103. Each ground port 212 is connected to the input terminal 103 with a resistor 109 in between. Each ground port 213 is connected to the ground with a ground line 106.

The speed mode detection circuit 101B includes a single input terminal 103. Each of the mode sensors 200 (201 and 202) is connected to the input terminal 103 with a power line 107. The power port 211 in a first mode sensor 201 is connected to the input terminal 103 with a first power line 107A and the power line 107. The power port 211 in a second mode sensor 202 is connected to the input terminal 103 with a second power line 107B and the power line 107. The first power line 107A and the second power line 107B are connected in parallel with each other to the input terminal 103. The power line 107 connects the input terminal 103 to the first power line 107A and the second power line 107B. A voltage is applied to the first mode sensor 201 through the input terminal 103, the power line 107, and the first power line 107A. A voltage is applied to the second mode sensor 202 through the input terminal 103, the power line 107, and the second power line 107B.

The speed mode detection circuit 101B in the present embodiment includes a single output terminal 102. The multiple mode sensors 200 (201 and 202) are connected in parallel with each other to the output terminal 102. A single output lead wire 104 is connected to the single output terminal 102.

Each of the mode sensors 200 (201 and 202) is connected to the output terminal 102 with a signal line 108. The single output terminal 102 is connected to the multiple mode sensors 200 (201 and 202). The signal line 108 connects the output terminal 102 to the first mode sensor 201 and the second mode sensor 202. Each of the ground port 212 in the first mode sensor 201 and the ground port 212 in the second mode sensor 202 is connected to the output terminal 102 with the signal line 108.

Each of the mode sensors 200 (201 and 202) is connected to the input terminal 103 with the corresponding resistor 109 in between. The resistors 109 include a first resistor 109A and a second resistor 109B. The first resistor 109A is connected to the first mode sensor 201. The second resistor 109B is connected to the second mode sensor 202. The first resistor 109A connects the power line 107 and the signal line 108. The second resistor 109B connects the signal line 108 and the second mode sensor 202. The ground port 212 in the first mode sensor 201 is connected to the input terminal 103 with the signal line 108, the first resistor 109A, and the power line 107. The ground port 212 in the second mode sensor 202 is connected to the input terminal 103 with the second resistor 109B, the signal line 108, the first resistor 109A, and the power line 107.

Each of the mode sensors 200 (201 and 202) is connected to the ground with the ground line 106. The ground port 213 in the first mode sensor 201 is connected to the ground with a first ground line 106A and the ground line 106. The ground port 213 in the second mode sensor 202 is connected to the ground with a second ground line 106B and the ground line 106. The first ground line 106A and the second ground line 106B are connected in parallel with each other to the ground. The ground line 106 connects the ground to the first ground line 106A and the second ground line 106B.

As in the embodiment described above, the speed switch lever 12 is moved to the first position P1, the second position P2, and the third position P3. The first mode sensor 201 is located on the mode sensor board 100 to detect the permanent magnet 120 with the speed switch lever 12 at the first position P1 and not to detect the permanent magnet 120 with the speed switch lever 12 at the second position P2 or at the third position P3. The second mode sensor 202 is located on the mode sensor board 100 to detect the permanent magnet 120 with the speed switch lever 12 at the third position P3 and not to detect the permanent magnet 120 with the speed switch lever 12 at the first position P1 or the second position P2.

As shown in FIG. 27, with the speed switch lever 12 at the first position P1, the first mode sensor 201 detects the permanent magnet 120 and is turned on. With the speed switch lever 12 at least at the second position P2 or at the third position P3, the first mode sensor 201 does not detect the permanent magnet 120 and is turned off.

As shown in FIG. 27, with the speed switch lever 12 at the third position P3, the second mode sensor 202 detects the permanent magnet 120 and is turned on. With the speed switch lever 12 at least at the first position P1 or at the second position P2, the second mode sensor 202 does not detect the permanent magnet 120 and is turned off.

With the speed switch lever 12 at the first position P1 to switch the speed mode of the reducer 30 to the high-speed mode, the first mode sensor 201 is turned on and the second mode sensor 202 is turned off. With the first mode sensor 201 being on, the first output terminal 102A has a potential substantially equal to the potential of the ground. A current supplied from the input terminal 103 to the first resistor 109A flows through the first mode sensor 201, the first ground line 106A, and the ground line 106 to the ground and does not flow to the output terminal 102. A current supplied from the input terminal 103 to the first resistor 109A does not flow to the second resistor 109B and the second mode sensor 202. Thus, an output signal at the L level (first level) is output from the output terminal 102.

With the speed switch lever 12 at the second position P2 to switch the speed mode of the reducer 30 to the medium-speed mode, the first mode sensor 201 is turned off, and the second mode sensor 202 is turned off. With the first mode sensor 201 being off, the output terminal 102 has a higher potential than the ground. A current supplied from the input terminal 103 to the first resistor 109A flows through the signal line 108 to the output terminal 102 and does not flow to the ground. Thus, an output signal at the H level (second level) is output from the output terminal 102.

With the speed switch lever 12 at the third position P3 to switch the speed mode of the reducer 30 to the low-speed mode, the first mode sensor 201 is turned off, and the second mode sensor 202 is turned on.

Figure 28:
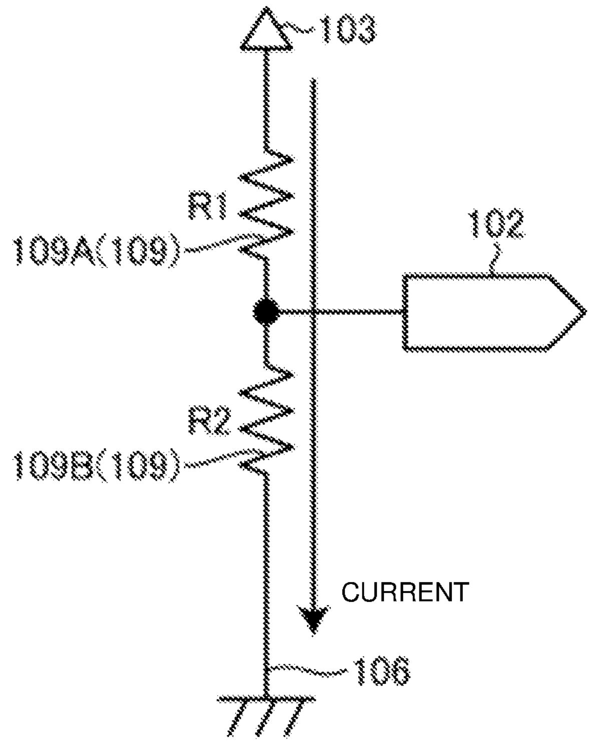
FIG. 28 is a partial diagram of the speed mode detection circuit with the speed switch lever in the second embodiment at a third position.

FIG. 28 is a partial diagram of the speed mode detection circuit 101B with the speed switch lever 12 in the embodiment at the third position P3. With the first mode sensor 201 being off and the second mode sensor 202 being on, as shown in FIG. 28, a current supplied from the input terminal 103 to the first resistor 109A flows through the second resistor 109B, the second mode sensor 202, the second ground line 106B, and the ground line 106 to the ground. In this case, an output signal output from the output terminal 102 has a voltage level resulting from voltage division with a resistance R1 of the first resistor 109A and a resistance R2 of the second resistor 109B. In other words, with the intensity (potential) at the output signal at the H level being set to H, an output signal at $[R2/(R1+R2)\times H]$ level is output from the output terminal 102.

Thus, the level of the output signal output from the output terminal 102 varies depending on the position of the speed switch lever 12. Thus, the torque threshold setting circuit 176 in the controller board 17 determines, based on an output signal from the output terminal 102, the speed mode of the reducer 30 that changes depending on the position of the speed switch lever 12.

The driver drill 1 according to the present embodiment includes the reducer 30 that operates in an operation mode of the multiple speed modes, the speed switch lever 12 moved to switch the speed mode, the multiple mode sensors 200 located in the direction of movement of the speed switch lever 12 to detect the speed switch lever 12, the mode sensor board 100 on which the mode sensors 200 are mounted, including the output terminal 102 connected to the mode sensors 200, and the controller board 17 connected to the output terminal 102 with the output lead wire 104 to determine the speed mode based on an output signal output from the output terminal 102. The multiple mode sensors 200 are connected in parallel with one another to the output terminal 102. Each of the mode sensors 200 is connected to the output terminal 102 with the signal line 108.

This structure avoids use of more output lead wires 104. In the present embodiment, the single output terminal 102 is connected to the speed mode detection circuit 101B, and the single output terminal 102 is connected to the controller board 17 with the single output lead wire 104. The torque threshold setting circuit 176 in the controller board 17 determines the speed mode of the reducer 30 based on the output signal output from the single output terminal 102. The multiple mode sensors 200 connected in parallel with one another are connected to the output terminal 102 to reduce the number of output terminals 102. This structure avoids use of more output lead wires 104 connecting the output terminal 102 and the controller board 17.

The mode sensors 200 in the present embodiment include the first mode sensor 201 and the second mode sensor 202. The resistor 109 includes the first resistor 109A connected to the first mode sensor 201 and the second resistor 109B connected to the second mode sensor 202. With the speed switch lever 12 at the first position P1 to switch the operation mode to the high-speed mode, the output terminal 102 outputs an output signal at the L level. With the speed switch lever 12 at the second position P2 to switch the operation mode to the medium-speed mode, the output terminal 102 outputs an output signal at the H level. With the speed switch lever 12 at the third position P3 to switch the operation mode to the low-speed mode, an output signal output from the output terminal 102 has a voltage level resulting from voltage division with the resistance R1 of the first resistor 109A and the resistance R2 of the second resistor 109B. In the present embodiment, the output terminal 102 outputs an output signal at $[R2/(R1+R2)\times H]$ level.

This allows the controller board 17 to determine the speed mode of the reducer 30 that changes depending on the position of the speed switch lever 12, with the level of the output signal output from the output terminal 102 varying depending on the position of the speed switch lever 12.

Third Embodiment

A third embodiment will now be described. The same or corresponding components as those in the above embodiment are given the same reference numerals herein and will be described briefly or will not be described.

Speed Mode Detection Circuit

Figure 29:
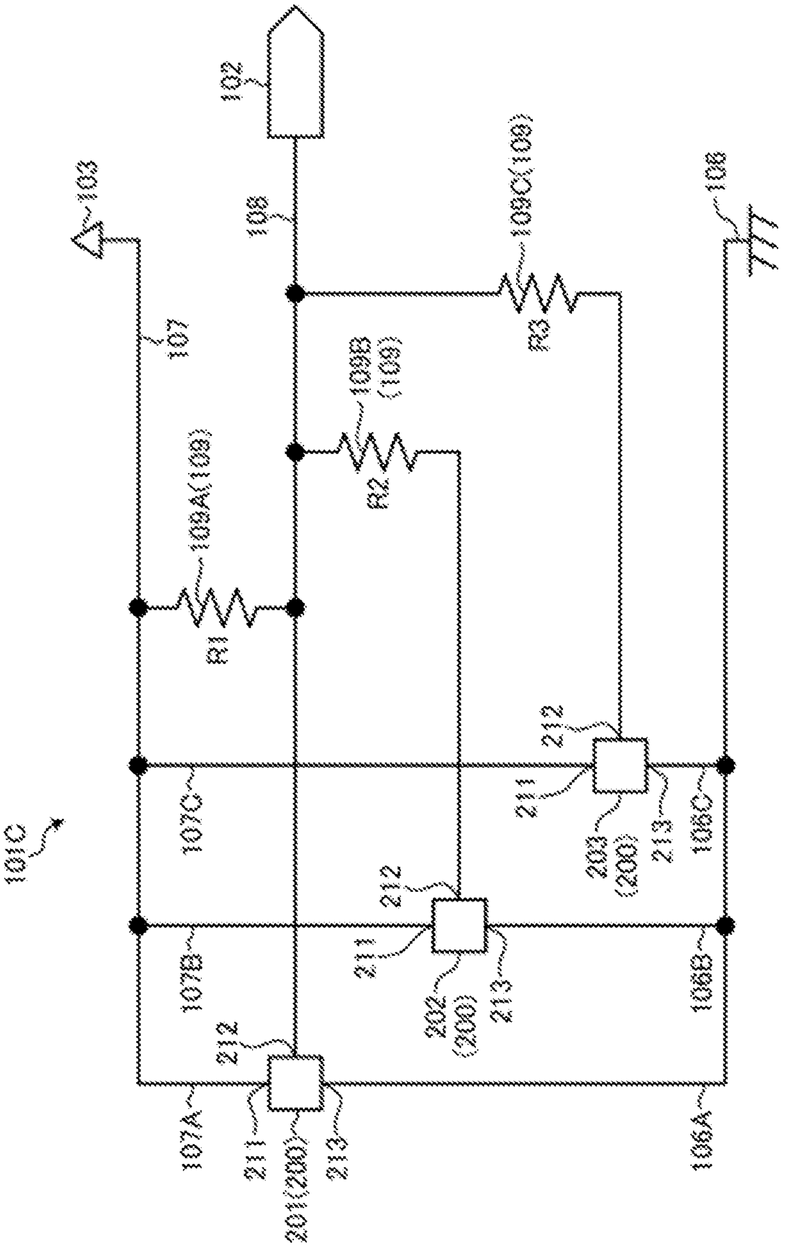
FIG. 29 is a diagram of a speed mode detection circuit in a third embodiment.

FIG. 29 is a diagram of a speed mode detection circuit 101C in the present embodiment.

The speed mode detection circuit 101C in the present embodiment includes three mode sensors 200. The mode sensors 200 include a first mode sensor 201, a second mode sensor 202, and a third mode sensor 203. The speed mode detection circuit 101C includes a single output terminal 102 and a single input terminal 103.

As shown in FIG. 29, multiple mode sensors 200 (201, 202, and 203) are connected in parallel with one another to the input terminal 103. The multiple mode sensors 200 (201, 202, and 203) are connected in parallel with one another to the ground. The multiple mode sensors 200 (201, 202, and 203) are connected in parallel with one another to the output terminal 102.

Each of the mode sensors 200 (201, 202, and 203) includes power ports 211, ground ports 212, and ground ports 213. The power ports 211 receive a current from the input terminal 103. Each ground port 212 is connected to the input terminal 103 with the corresponding resistor 109 in between. Each ground port 213 is connected to a ground with a ground line 106.

Each of the mode sensors 200 (201, 202, and 203) is connected to the input terminal 103 with a power line 107. The power port 211 in a first mode sensor 201 is connected to the input terminal 103 with a first power line 107A and the power line 107. The power port 211 in a second mode sensor 202 is connected to the input terminal 103 with a second power line 107B and the power line 107. The power port 211 in a third mode sensor 203 is connected to the input terminal 103 with a third power line 107C and the power line 107. The first power line 107A, the second power line 107B, and the third power line 107C are connected in parallel with one another. The power line 107 connects the single input terminal 103 to the first power line 107A, the second power line 107B, and the third power line 107C. A voltage is applied to the first mode sensor 201 through the input terminal 103, the power line 107, and the first power line 107A. A voltage is applied to the second mode sensor 202 through the input terminal 103, the power line 107, and the second power line 107B. A voltage is applied to the third mode sensor 203 through the input terminal 103, the power line 107, and the third power line 107C.

Each of the multiple mode sensors 200 (201, 202, and 203) is connected to the output terminal 102 with a signal line 108. The signal line 108 connects the single output terminal 102 to the first mode sensor 201, the second mode sensor 202, and the third mode sensor 203.

Each of the mode sensors 200 (201, 202, and 203) is connected to the input terminal 103 with the corresponding resistor 109 in between. The resistors 109 include a first resistor 109A, a second resistor 109B, and a third resistor 109C. The first resistor 109A is connected to the first mode sensor 201. The second resistor 109B is connected to the second mode sensor 202. The third resistor 109C is connected to the third mode sensor 203. The first resistor 109A connects the power line 107 and the signal line 108. The second resistor 109B connects the signal line 108 and the second mode sensor 202. The third resistor 109C connects the signal line 108 and the third mode sensor 203.

The ground port 212 in the first mode sensor 201 is connected to the input terminal 103 with the signal line 108, the first resistor 109A, and the power line 107. The ground port 212 in the second mode sensor 202 is connected to the input terminal 103 with the second resistor 109B, the signal line 108, the first resistor 109A, and the power line 107. The ground port 212 in the third mode sensor 203 is connected to the input terminal 103 with the third resistor 109C, the signal line 108, the first resistor 109A, and the power line 107.

Each of the mode sensors 200 (201, 202, and 203) is connected to the ground with the ground line 106. The ground port 213 in the first mode sensor 201 is connected to the ground with a first ground line 106A and the ground line 106. The ground port 213 in the second mode sensor 202 is connected to the ground with a second ground line 106B and the ground line 106. The ground port 213 in the third mode sensor 203 is connected to the ground with a third ground line 106C and the ground line 106. The first ground line 106A, the second ground line 106B, and the third ground line 106C are connected in parallel with one another. The ground line 106 connects the ground to the first ground line 106A, the second ground line 106B, and the third ground line 106C.

Figure 30:
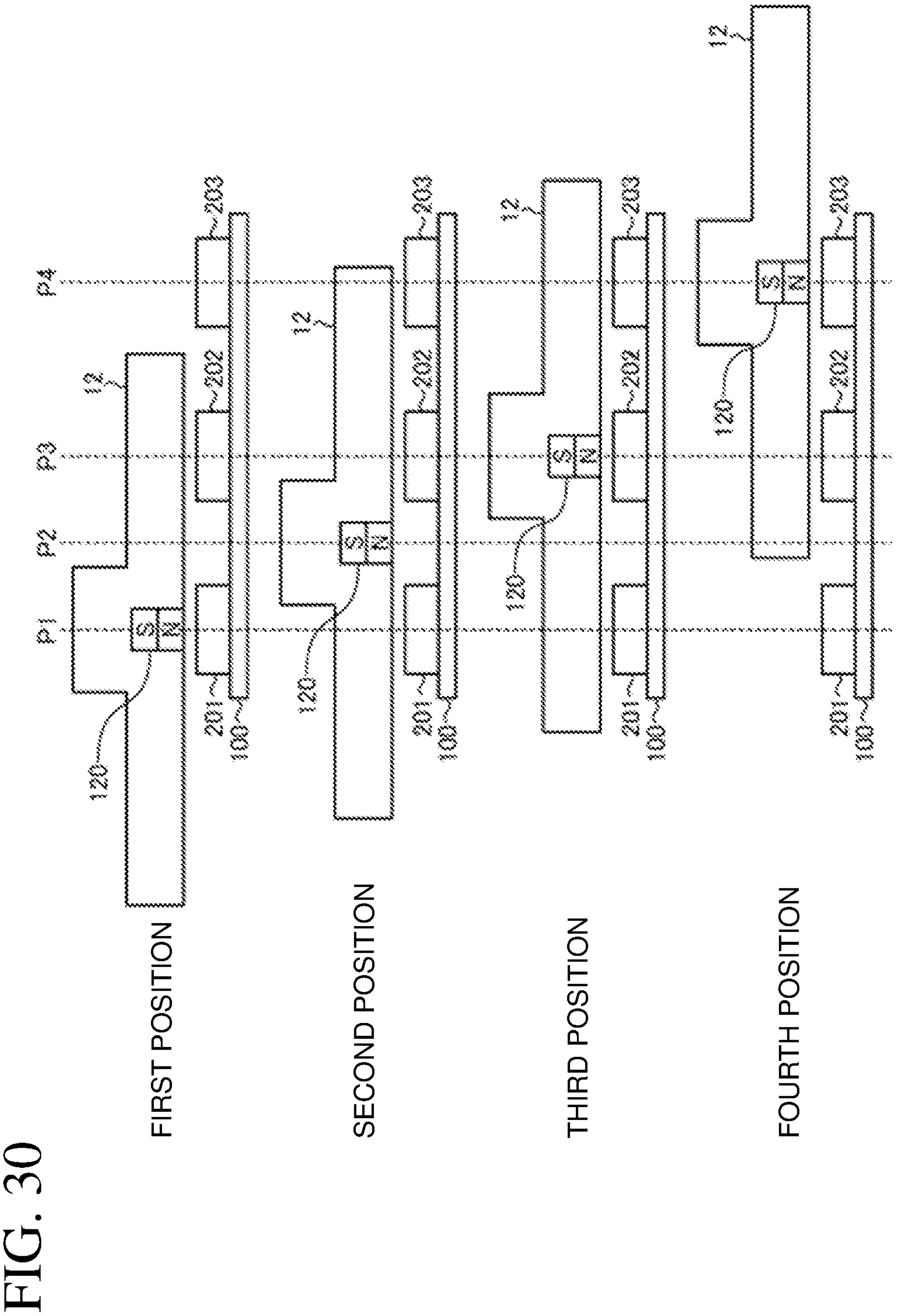
FIG. 30 is a diagram illustrating the position of a speed switch lever with respect to a mode sensor board in the third embodiment.

FIG. 30 is a diagram illustrating the position of the speed switch lever 12 respect to the mode sensor board 100. FIG. 31 is a diagram of the relationship between the position of the speed switch lever 12, the states of the mode sensors 200, and an output signal from the output terminal 102.

As shown in FIG. 30, the speed switch lever 12 is moved to the first position P1, the second position P2, the third position P3 and a fourth position P4. The first position P1 is defined rearward from the second position P2. The second position P2 is defined rearward from the third position P3. The third position P3 is defined rearward from the fourth position P4. The first mode sensor 201 is located rearward from the second mode sensor 202. The second mode sensor 202 is located rearward from the third mode sensor 203.

With the speed switch lever 12 at the first position P1, the permanent magnet 120 faces the first mode sensor 201 and does not face the second mode sensor 202 and the third mode sensor 203. With the speed switch lever 12 at the second position P2, the permanent magnet 120 does not face each of the first mode sensor 201, the second mode sensor 202, and the third mode sensor 203. With the speed switch lever 12 at the second position P2, the permanent magnet 120 faces the space between the first mode sensor 201 and the second mode sensor 202. With the speed switch lever 12 at the third position P3, the permanent magnet 120 faces the second mode sensor 202 and does not face the first mode sensor 201 and the third mode sensor 203. With the speed switch lever 12 at the fourth position P4, the permanent magnet 120 faces the third mode sensor 203 and does not face the first mode sensor 201 and the second mode sensor 202.

Each mode sensor 200 detects the permanent magnet 120 when the permanent magnet 120 held by the speed switch lever 12 faces the mode sensor 200. The first mode sensor 201 is located on the mode sensor board 100 to detect the permanent magnet 120 with the speed switch lever 12 at the first position P1 and not to detect the permanent magnet 120 with the speed switch lever 12 at the second position P2, the third position P3, and the fourth position P4. The second mode sensor 202 is located on the mode sensor board 100 to detect the permanent magnet 120 with the speed switch lever 12 at the third position P3 and not to detect the permanent magnet 120 with the speed switch lever 12 at the first position P1, the second position P2, and the fourth position P4. The third mode sensor 203 is located on the mode sensor board 100 to detect the permanent magnet 120 with the speed switch lever 12 at the fourth position P4 and not to detect the permanent magnet 120 with the speed switch lever 12 at the first position P1, the second position P2, and the third position P3.

In response to detecting the permanent magnet 120, the mode sensor 200 is turned on to connect the ground port 212 and the ground port 213. In response to detecting no permanent magnet 120, the mode sensor 200 is turned off not to connect the ground port 212 and the ground port 213.

As shown in FIG. 31, with the speed switch lever 12 at the first position P1, the first mode sensor 201 detects the permanent magnet 120 and is turned on. With the speed switch lever 12 at least at the second position P2, at the third position P3, or at the fourth position P4, the first mode sensor 201 does not detect the permanent magnet 120 and is turned off.

As shown in FIG. 31, with the speed switch lever 12 at the third position P3, the second mode sensor 202 detects the permanent magnet 120 and is turned on. With the speed switch lever 12 at least at the first position P1, at the second position P2, or at the fourth position P4, the second mode sensor 202 does not detect the permanent magnet 120 and is turned off.

As shown in FIG. 31, with the speed switch lever 12 at the fourth position P4, the third mode sensor 203 detects the permanent magnet 120 and is turned on. With the speed switch lever 12 at least at the first position P1, at the second position P2, or at the third position P3, the second mode sensor 202 does not detect the permanent magnet 120 and is turned off.

With the speed switch lever 12 at the first position P1 to switch the speed mode of the reducer 30 to the high-speed mode, the first mode sensor 201 is turned on, and the second mode sensor 202 and the third mode sensor 203 are each turned off. With the first mode sensor 201 being on, the first output terminal 102A has a potential substantially equal to the potential of the ground. A current supplied from the input terminal 103 to the first resistor 109A flows with the first mode sensor 201, the first ground line 106A, and the ground line 106 to the ground and does not flow to the output terminal 102. A current supplied from the input terminal 103 to the first resistor 109A does not flow to the second resistor 109B and the third resistor 109C. In other words, the current supplied from the input terminal 103 to the first resistor 109A does not flow to the second mode sensor 202 and the third mode sensor 203. Thus, an output signal at the L level (first level) is output from the output terminal 102.

With the speed switch lever 12 at the second position P2 to switch the speed mode of the reducer 30 to the medium-speed mode, the first mode sensor 201, the second mode sensor 202, and the third mode sensor 203 are all turned off. With the first mode sensor 201 being off, the output terminal 102 has a higher potential than the ground. A current supplied from the input terminal 103 to the first resistor 109A flows through the signal line 108 to the output terminal 102 and does not flow to the ground. Thus, an output signal at the H level (second level) is output from the output terminal 102.

With the speed switch lever 12 at the third position P3 to switch the speed mode of the reducer 30 to the low-speed mode, the first mode sensor 201 is turned off, the second mode sensor 202 is turned on, and the third mode sensor 203 is turned off. A current supplied from the input terminal 103 to the first resistor 109A flows to the ground through the second resistor 109B, the second mode sensor 202, the second ground line 106B, and the ground line 106. In this case, an output signal output from the output terminal 102 has a voltage level resulting from voltage division with a resistance R1 of the first resistor 109A and a resistance R2 of the second resistor 109B. In other words, with the intensity (potential) at the output signal at the H-level being set to H, an output signal at [R2/(R1+R2)×H] level is output from the output terminal 102.

With the speed switch lever 12 at the fourth position P4 to switch the speed mode of the reducer 30 to an ultra-low-speed mode that is slower than the low-speed mode, the first mode sensor 201 is turned off, the second mode sensor 202 is turned off, and the third mode sensor 203 is turned on. A current supplied from the input terminal 103 to the first resistor 109A flows through the third resistor 109C, the third mode sensor 203, the third ground line 106C, and the ground line 106 to the ground. In this case, an output signal output from the output terminal 102 has a voltage level resulting from voltage division with the resistance R1 of the first resistor 109A and a resistance R3 of the third resistor 109C. In other words, with the intensity (potential) at the output signal at the H-level being set to H, an output signal at [R3/(R1+R3)×H] level is output from the output terminal 102.

The structure according to the present embodiment also avoids use of more output lead wires 104. In the present embodiment, the single output terminal 102 is connected to the speed mode detection circuit 101C. The single output terminal 102 is connected to the controller board 17 with the single output lead wire 104. The torque threshold setting circuit 176 in the controller board 17 determines the speed mode of the reducer 30 based on an output signal output from the single output terminal 102. The multiple mode sensors 200 connected in parallel with each other are connected to the output terminal 102 to reduce the number of output terminals 102. This structure avoids use of more output lead wires 104 connecting the output terminal 102 and the controller board 17.

Other Embodiments

In the embodiment described above, the speed mode of the reducer 30 (operation unit) is switched as the operation mode of the reducer 30 (operation unit) by moving the speed switch lever 12 (operable member). The drive mode of the motor 6 may be switched as the operation mode of the motor 6 (operation unit) by moving the forward-reverse switch lever 11 (operable member). The forward-reverse switch lever 11 is moved to a left position (first position), a middle position (second position), and a right position (third position). With the forward-reverse switch lever 11 moved to the left position, the drive mode of the motor 6 is set to a forward mode. With the forward-reverse switch lever 11 moved to the center position, the operation of the trigger lever 10 is prevented, and the drive mode of the motor 6 is set to a stop mode. With the forward-reverse switch lever 11 moved to the right position, the drive mode of the motor 6 is set to a reverse mode. A permanent magnet is fixed to the forward-reverse switch lever 11, and a mode sensor board including at least two mode sensors that detect the permanent magnet is located to face the forward-reverse switch lever 11, and thus the controller board 17 can determine the drive mode of the motor 6 based on an output signal output from the output terminal of the mode sensor board.

In the embodiments described above, the mode sensor 200 is a Hall sensor that detects a permanent magnet held in the operable member. The mode sensor 200 may be a contact sensor that detects an operable member by at least partially contacting the operable member. The mode sensor 200 may also be a tact switch that detects an operable member by at least partially contacting the operable member. The tact switch may be referred to as a contact sensor.

In the embodiments described above, the number of mode sensors 200 may be equal to the number of operation modes. For the three speed modes (operation modes) as described above in the first and second embodiments, the structure may include three mode sensors 200. For the four speed modes (operation modes) as described above in the third embodiment, the structure may include four mode sensors 200.

In the above embodiments, the driver drill 1 is powered by the battery pack 20 attached to the battery mount 5. The driver drill 1 may use utility power (alternating current power supply).

The electric work machine in the above embodiments is a driver drill (vibration driver drill), which is an example of a power tool. The power tool is not limited to a driver drill. Examples of the power tool include an impact driver, an angle drill, a screwdriver, a hammer, a hammer drill, a circular saw, and a reciprocating saw.

In the above embodiments, the electric work machine may be an outdoor power equipment. Examples of the outdoor power equipment include a chain saw, a mower, a lawn mower, a hedge trimmer, and a blower.

REFERENCE SIGNS LIST

1 driver drill
2 housing
2L left housing
2R right housing
2S screw
3 rear cover
3S screw
4 casing
4A first casing
4B second casing
4C bracket plate
4D stop plate
4E screw
4F screw
4G guide groove
4R reference symbol
4S screw
5 battery mount
6 motor
7 power transmission
8 output unit
9 fan
10 trigger lever
10A trigger signal generation circuit
11 forward-reverse switch lever
11A forward-reverse switch signal generation circuit
12 speed switch lever
13 mode switch ring
13A first symbol
13B second symbol
13C third symbol
14 light
15 interface panel
16 dial
16A threshold signal generation circuit
17 controller board
18 inlet
19 outlet
20 battery pack
21 motor compartment
22 grip
23 battery holder
24 operation unit
25 display
26 controller case

27 panel opening
28 dial opening
30 reducer
31 first planetary gear assembly
31A pin
31C first carrier
31S pinion gear
32 second planetary gear assembly
32A pin
32C second carrier
32D recess
32F cam tooth
32P planetary gear
32R internal gear
32S sun gear
33 third planetary gear assembly
33A pin
33C third carrier
33P planetary gear
33R internal gear
33S sun gear
34 speed switching member
34A ring
34B slider
34C lever
34D pin
34E projection
34F coil spring
34G coil spring
35 annular member
36 cam ring
37 lever
38 guide rod
39 coil spring
40 vibrator
41 first cam
42 second cam
43 vibration switch ring
43S opposing portion
43T protrusion
44 stop ring
45 support ring
46 steel ball
47 washer
48 cam ring
50 spindle locking assembly
51 lock cam
52 lock ring
61 stator
61A stator core
61B front insulator
61C rear insulator
61D coil
61E short-circuiting member
62 rotor
62A rotor core
62B permanent magnet
63 rotor shaft
64 bearing
65 bearing
71 first speed switcher
72 second speed switcher
81 spindle
81F flange
81R threaded hole
82 chuck
83 bearing
84 bearing
87 coil spring
90 rotation sensor board
100 mode sensor board
101 speed mode detection circuit
101B speed mode detection circuit
101C speed mode detection circuit
102 output terminal
102A first output terminal
102B second output terminal
103 input terminal
104 output lead wire
104A first output lead wire
104B second output lead wire
105 input lead wire
106 ground line
106A first ground line
106B second ground line
106C third ground line
107 power line
107A first power line
107B second power line
107C third power line
108 signal line
108A first signal line
108B second signal line
109 resistor
109A first resistor
109B second resistor
109C third resistor
120 permanent magnet
121 recess
171 motor control circuit
172 motor drive circuit
173 voltage adjustment circuit
174 torque estimation circuit
175 correlation data storage circuit
176 torque threshold setting circuit
200 mode sensor
201 first mode sensor
202 second mode sensor
203 third mode sensor
211 power port
212 ground port
213 ground port
250 cam pin
250A groove
311P planetary gear
312P planetary gear
311R internal gear
311F cam tooth
312R internal gear
311S larger-diameter portion
312F cam tooth
312S smaller-diameter portion
1000 control system
AX rotation axis
P1 first position
P2 second position
P3 third position
P4 fourth position

What is claimed is:

1. A driver drill, comprising:
a motor;
an output unit driven by the motor;
a vibrator configured to vibrate the output unit in an axial direction;

a mode switch ring operable to change operation modes of the vibrator, the operation modes including a vibration mode and a non-vibration mode;

a reducer operable in a speed mode of at least three speed modes including a high-speed mode, a medium-speed mode, and a low-speed mode;

a speed switch lever movable to switch the speed mode of the reducer;

a plurality of mode sensors located in a direction of movement of the speed switch lever to detect the speed switch lever, the plurality of mode sensors being equal in number to or fewer than the at least three speed modes;

a mode sensor board on which the plurality of mode sensors are mounted, the mode sensor board including an output terminal connected to the plurality of mode sensors;

an operation unit configured to change a drive mode of the motor between a drill mode in which the motor is driven independently of a torque applied to the motor and a clutch mode in which the motor is stopped in response to torque applied to the motor exceeding a torque threshold;

a dial configured to change the torque threshold in the clutch mode; and a controller board connected to the output terminal with an output lead wire to determine the speed mode based on an output signal output from the output terminal, the controller board configured to stop the motor in response to torque applied to the motor exceeding the torque threshold in the clutch mode based on detection signal from the mode sensors, wherein the torque thresholds are set to different values for an input value of the torque threshold in the high-speed mode, in the medium-speed mode, and the low-speed mode.

2. The driver drill according to claim 1, wherein the plurality of mode sensors are fewer than the at least three speed modes by one.

3. The driver drill according to claim 1, wherein each of a plurality of the output terminals is connected to a corresponding mode sensor of the plurality of mode sensors.

4. The driver drill according to claim 3, wherein the mode sensor board includes an input terminal connected to the plurality of mode sensors, and the plurality of mode sensors receive a voltage applied through the input terminal.

5. The driver drill according to claim 4, wherein the plurality of mode sensors are connected in parallel with one another, and each of the plurality of mode sensors is connected to the input terminal with a power line.

6. The driver drill according to claim 5, wherein the mode sensor board includes the input terminal being a single input terminal.

7. The driver drill according to claim 4, wherein the speed switch lever holds a permanent magnet, each of the plurality of mode sensors includes a Hall sensor configured to detect the permanent magnet, and each of the plurality of mode sensors includes a power port to which a current is supplied, a first ground port connected to the input terminal with a resistor in between, and a second ground port connected to a ground.

8. The driver drill according to claim 7, wherein the plurality of mode sensors include a first mode sensor and a second mode sensor, the output terminal includes a first output terminal connected to the first mode sensor, and a second output terminal connected to the second mode sensor, the resistor includes a first resistor connected to the first mode sensor, and a second resistor connected to the second mode sensor, with the speed switch lever at a first position to switch the speed mode to a first speed mode, the first output terminal outputs an output signal at a first level, and the second output terminal outputs an output signal at a second level, with the speed switch lever at a second position to switch the speed mode to a second speed mode, the first output terminal outputs an output signal at the second level, and the second output terminal outputs an output signal at the second level, and with the speed switch lever at a third position to switch the speed mode to a third speed mode, the first output terminal outputs an output signal at the second level, and the second output terminal outputs an output signal at the first level.

9. The driver drill according to claim 1, wherein the plurality of mode sensors are connected in parallel with one another, and each of the plurality of mode sensors is connected to the output terminal with a signal line.

10. A driver drill, comprising:

a motor;

an output unit driven by the motor;

a vibrator configured to vibrate the output unit in an axial direction;

a mode switch ring operable to change operation modes of the vibrator, the operation modes including a vibration mode and a non-vibration mode;

a reducer operable in a speed mode of a plurality of speed modes including a high-speed mode, a medium-speed mode, and a low-speed mode;

a speed switch lever movable to switch the speed mode of the reducer;

a plurality of mode sensors located in a direction of movement of the speed switch lever to detect the speed switch lever, the plurality of mode sensors being connected in parallel with one another;

a mode sensor board on which the plurality of mode sensors are mounted, the mode sensor board including an output terminal connected to the plurality of mode sensors;

an operation unit configured to change a drive mode of the motor between a drill mode in which the motor is driven independently of a torque applied to the motor and a clutch mode in which the motor is stopped in response to torque applied to the motor exceeding a torque threshold;

a dial configured to change the torque threshold in the clutch mode; and a controller board connected to the output terminal with an output lead wire to determine the speed mode based on an output signal output from the output terminal, the controller board configured to stop the motor in response to torque applied to the motor exceeding the torque threshold in the clutch mode based on detection signal from the mode sensors, wherein each of the plurality of mode sensors is connected to the output terminal with a signal line, and the torque thresholds are set to different values for an input value of the torque threshold in the high-speed mode, in the medium-speed mode, and the low-speed mode.

11. The driver drill according to claim 9, wherein the mode sensor board includes the output terminal being a single output terminal.

12. The driver drill according to claim 9, wherein the mode sensor board includes an input terminal connected to the plurality of mode sensors, and the plurality of mode sensors receive a voltage applied through the input terminal.

13. The driver drill according to claim 12, wherein each of the plurality of mode sensors is connected to the input terminal with a power line.

14. The driver drill according to claim 13, wherein the mode sensor board includes the input terminal being a single input terminal.

15. The driver drill according to claim 12, wherein the speed switch lever holds a permanent magnet, each of the plurality of mode sensors includes a Hall sensor configured to detect the permanent magnet, and each of the plurality of mode sensors includes a power port to which a current is supplied, a first ground port connected to the input terminal with a resistor in between, and a second ground port connected to a ground.

16. The driver drill according to claim 15, wherein the plurality of mode sensors include a first mode sensor and a second mode sensor, the resistor includes a first resistor connected to the first mode sensor, and a second resistor connected to the second mode sensor, with the speed switch lever at a first position to switch the speed mode to a first speed mode, the output terminal outputs an output signal at a first level, with the speed switch lever at a second position to switch the speed mode to a second speed mode, the output terminal outputs an output signal at a second level, and with the speed switch lever at a third position to switch the speed mode to a third speed mode, the output terminal outputs an output signal at a voltage level resulting from voltage division with a resistance of the first resistor and a resistance of the second resistor.

17. The driver drill according to claim 8, wherein the plurality of mode sensors are turned on to connect the first ground port and the second ground port in response to detecting the permanent magnet, and are turned off not to connect the ground port and the ground port in response to detecting no permanent magnet.

18. The driver drill according to claim 17, wherein the first position is defined rearward from the second position, the second position is defined rearward from the third position, the first mode sensor is located to detect the permanent magnet with the speed switch lever at the first position, and located not to detect the permanent magnet with the speed switch lever at the second position or the third position, and the second mode sensor is located to detect the permanent magnet with the speed switch lever at the third position, and located not to detect the permanent magnet with the speed switch lever at the first position or the second position.

* * * * *